United States Patent [19]
Miyamoto et al.

[11] Patent Number: 5,425,335
[45] Date of Patent: Jun. 20, 1995

[54] AUTOMOBILE ENGINE

[75] Inventors: Katsuhiko Miyamoto; Kazumasa Iida; Tetsuo Chamoto, all of Kyoto, Japan

[73] Assignee: Mitsubishi Jidosha Kogyo Kabushiki Kaisha, Tokyo, Japan

[21] Appl. No.: 104,042

[22] PCT Filed: Dec. 25, 1992

[86] PCT No.: PCT/JP92/01718

§ 371 Date: Sep. 28, 1993

§ 102(e) Date: Sep. 28, 1993

[87] PCT Pub. No.: WO93/13306

PCT Pub. Date: Jul. 8, 1993

[30] Foreign Application Priority Data

| Dec. 26, 1991 | [JP] | Japan | 3-344746 |
| Dec. 26, 1991 | [JP] | Japan | 3-344747 |
| Dec. 26, 1991 | [JP] | Japan | 3-344749 |
| Dec. 26, 1991 | [JP] | Japan | 3-344750 |
| Dec. 27, 1991 | [JP] | Japan | 3-346708 |
| Dec. 25, 1992 | [JP] | Japan | 4-346106 |

[51] Int. Cl.⁶ .................................. F02B 77/00
[52] U.S. Cl. .................................. 123/198 F; 123/481
[58] Field of Search .................. 123/198 F, 481

[56] References Cited

U.S. PATENT DOCUMENTS

| 4,274,382 | 6/1981 | Sugasawa et al. | 123/198 F |
| 4,459,960 | 7/1984 | Ueno et al. | 123/198 F |
| 4,608,952 | 9/1986 | Morita et al. | 123/198 F |
| 5,105,779 | 4/1992 | Thompson | 123/198 F |

FOREIGN PATENT DOCUMENTS

| 58-135336 | 8/1983 | Japan . |
| 59-063338 | 4/1984 | Japan . |
| 59-051144 | 7/1984 | Japan . |
| 3213604 | 12/1991 | Japan . |

*Primary Examiner*—Noah P. Kamen

[57] ABSTRACT

Disclosed is an automobile engine which has different ranges for the partial cylinder operation mode depending upon whether or not the engine is idling. The partial cylinder operation mode is selectable in different operation ranges in response to operating status of an air-conditioner, a power steering switch or a throttle opening sensor. Thus, the engine can reliably assume the partial cylinder operation mode in a wide operation range without stall, thereby accomplishing fuel saving.

23 Claims, 20 Drawing Sheets

AUTOMOBILE ENGINE

FIELD OF THE INVENTION

This invention relates in general to an automobile engine, and more particularly to an automobile engine having a mechanism for selectively disconnecting some cylinders by interrupting their associated inlet and exhaust valve systems.

DESCRIPTION OF THE RELATED ART

There is known an internal combustion engine which includes valve interrupting mechanisms for selectively stopping the air and fuel supply for some cylinders so as to reduce engine output and accomplish a substantial saving of fuel. According to various engine operational data, a control unit controls the valve interrupting mechanisms so as to interrupt the operation of inlet and exhaust valves of certain cylinders and stop the air and fuel supply thereto once the engine is operating under a particular condition. When the engine gets out of such a particular condition, the control unit resumes the operation of the interrupted valves, thereby allowing the air and fuel supply for the previously disconnected cylinders.

In the case of a 4-cylinder engine, for example, cylinders such as No. 1 and another cylinder having the same piston stroke are disconnected during the operation of the engine, thereby accomplishing a substantial saving of fuel. The foregoing operation mode is called "partial or two-cylinder operation mode" hereinafter.

The cylinders to be disconnected are determined according to a map which is used to select the full or partial cylinder operation mode and is plotted based on an engine speed and load data such as volumetric efficiency of air in the cylinders.

Generally speaking, not only ordinary automobile engines, but also the engine with the partial cylinder operation function, have to maintain their normal combustion performance during idling. For instance, when the partial operation mode is selected to improve fuel efficiency during the idling, fuel may be saved by 30% to 40%. However, in the 4-cylinder engine, a return torque of the engine under the two-cylinder operation, shown by a dotted line in FIG. 18, is less than the return torque (shown by a solid line) of the engine under the four-cylinder operation. As a result, the engine under the two-cylinder operation tends to suffer from unstable idle speed when external disturbances are applied.

During the partial cylinder operation, the engine suffers from a reduced inertia efficiency of intake air due to fewer active cylinders for the combustion stroke, and the volumetric efficiency becomes too small to efficiently produce a sufficient output.

When the engine is idling with some cylinders disconnected, it suffers from unstable idling speed or stall if an air-conditioner or a power steering is actuated.

It is therefore an object of the invention to provide an automobile engine which can overcome the foregoing problems of conventional engines with the partial cylinder operation. Especially, when the partial operation mode is selected during the idling, the engine happens to reduce its rotational speed for some reason. In such a case, the partial cylinder operation mode is canceled so as to protect the engine against the foregoing problems.

In the engine with the partial cylinder operation, a switchover mechanism is used for switching the full cylinder operation mode over to the partial cylinder operation mode or vice versa. For example, a hydraulic mechanism is employed to enable and disable the movement of plungers within rocker shafts. Sometimes times the engine is required to return to its previous operation mode immediately after it is set to either the full or partial cylinder operation mode. In other words, when the engine is operating under a state which is near the border between the full cylinder operation mode and the partial cylinder operation mode, the engine has to be frequently switched over between these two modes.

In such a case, the plungers should momentarily change their positions. The plungers should be released before they are completely engaged with their mating members in the rocker shafts. In another case, the plungers have to be engaged with the mating members immediately after they are released therefrom. Thus, the position of the plungers becomes unstable, or the plungers and mating members may collide with one another, thereby unfortunately damaging the valve mechanisms.

It is another object of the invention to provide an automobile engine which includes a mechanism for allowing a frequent switchover between the full and partial cylinder operation modes without any damage to the valve mechanisms, thereby solving the foregoing problem of prior-art automobile engines.

Not only ordinary automobile engines but also automobile engines with the partial cylinder operation mode are usually provided with an idle speed control (ISC) mechanism, which functions to increase the amount of intake air as the engine load is increased due to the operation of a device such as an air conditioner, thereby protecting he engine against an unreliable rotation or stall due to a reduced idling speed.

Assume that the engine with the partial cylinder operation has such an idle speed control mechanism. When the quantity of air is increased due to the actuation of the air-conditioner, the volumetric efficiency is increased accordingly, which switches the engine from the partial cylinder operation mode to the full cylinder operation mode. Therefore, the merit of the partial engine operation may be offset.

A further object of the invention is to provide an automobile engine which can overcome the foregoing problem by means of a mechanism for allowing the continuation of the partial cylinder operation even when the air-conditioner is actuated in this mode.

When it is operating at a low speed in the partial cylinder operation mode, the engine tends to be slow to produce an output necessary for acceleration due to delayed air intake or delayed operation of an actuator. This is because the engine is usually designed to be ready for the acceleration after it is confirmed based on the foregoing map that a boost pressure is increased by opening a throttle valve and becomes sufficiently large for the acceleration in the full cylinder operation mode.

When the full or partial cylinder operation mode is judged based on the boost pressure, the engine may suffer from an insufficient output before such judgment is reached. Further, the engine may be subject to abnormal vibrations when the combustion stroke is carried out with a large amount of fuel injected in response to the throttle opening. The engine may produce undesirable shocks when its speed is changed due to its switchover from the partial cylinder operation mode to the full cylinder operation mode.

It is still another object of the invention to provide an automobile engine which can be quickly switched from the partial cylinder operation mode to the full cylinder operation mode at the time of acceleration, so that the engine can be free from various problems as well as an insufficient output for the acceleration.

The engine with the partial cylinder operation sometimes suffers from vibrations during the combustion stroke because of the reduced number of active cylinders. Such vibrations would be transmitted to a vehicle body via an engine mount, producing uncomfortable noise in the passenger compartment room. This phenomenon is particularly remarkable when the engine speed is low in the partial cylinder operation mode.

It is conceivable to operate all the valves even in the partial cylinder operation mode so as to suppress the vibrations. However, such a measure is not desirable since fuel efficiency is strongly demanded when the engine is operating at a low speed, and since it is not preferable to cancel the partial cylinder operation mode. Therefore, the vibrations of the automobile body remain unsolved.

It is a further object of the invention to provide an automobile engine which includes a mechanism for suppressing the vibrations while the engine is operating at a low speed in the partial cylinder operation mode.

SUMMARY OF THE INVENTION

According to the invention, an automobile engine has the partial cylinder operation mode by disconnecting some cylinders, and comprises an engine speed sensor for detecting an engine speed; a boost pressure sensor for providing boost pressure data to detect a negative pressure of an intake pipe; and a control unit for changing a range for the partial cylinder operation mode, which is set based on the detected engine speed and the boost pressure data, in response to an output from a load sensor for detecting an engine load.

In this arrangement, the load sensor may be an idle switch.

Further, the control unit may set a lowest idling speed below a lowest non-idling speed.

The control unit includes a map in which the partial cylinder operation range is set in such a manner that the volumetric efficiency is gradually increased between a desired low speed range and a desired intermediate speed range during the non-idling operation, and another map in which the partial cylinder operation range is set in a manner such that the volumetric efficiency is decreased between a desired idle speed and a desired low speed range and is then increased between the desired low speed range and a desired intermediate speed range.

The load sensor may be an air-conditioner switch, a power steering switch, or a throttle opening sensor.

In the engine of the invention, the partial cylinder operation mode may be canceled when a variation of the throttle opening detected by the throttle opening sensor is above a predetermined value.

Further, the partial cylinder operation range may be set in a manner such that the volumetric efficiency is momentarily increased when the engine speed is low.

The partial cylinder operation range may be set in a manner such that the volumetric efficiency is decreased between a desired idling speed and a desired low speed range but is gradually increased between the desired low speed range and a desired intermediate speed range.

The control unit may detect the idling of the engine, and cancel the partial cylinder operation mode when detecting the actuation of an air-conditioner, power steering, or an abnormal engine speed.

The control unit inhibits the partial cylinder operation mode for a preset period of time after detecting non-actuation of the air-conditioner or the power steering.

During the actuation of the air-conditioner in the partial cylinder operation mode, an engine output may be set to be larger than the engine output during the non-actuation of the air-conditioner in the partial cylinder operation mode.

Further, during the actuation of the power steering in the partial cylinder operation mode, an engine output may be set to be larger than the engine output during non-actuation of the power steering in the partial cylinder operation mode.

The control unit may inhibit the partial cylinder operation mode when an engine speed is below a predetermined value.

The control unit may vary the partial cylinder operation range depending upon the actuation or non-actuation of the air-conditioner when the engine is not idling.

During the actuation of the air-conditioner, the control unit may set a lowest engine speed to be higher than a lowest engine speed during the non-actuation of the air-conditioner.

In addition, the control unit may include a map in which the partial cylinder operation range is set in a manner such that the volumetric efficiency is gradually increased between a desired low speed range and a desired intermediate speed range during the actuation of the air-conditioner, and another map in which the partial cylinder operation range is set in a manner such that the volumetric efficiency is decreased between a desired idle speed and a desired low speed range and is then increased between the desired low speed range and a desired intermediate speed range during the non-actuation of the air-conditioner.

The control unit inhibits for a preset period of time the full cylinder operation mode from being switched over to the partial cylinder operation mode even after the engine becomes ready for the partial cylinder operation mode.

The preset period of time for inhibiting the switchover is lengthened as the engine speed becomes lower.

Further, the control unit inhibits for a preset period of time the partial cylinder operation mode from being switched over to the full cylinder operation mode even after the engine gets ready for the full cylinder operation mode.

The preset period of time for inhibiting the switchover may be lengthened as the engine speed becomes lower.

The control unit may set the period of time for inhibiting the switchover of the partial cylinder operation mode to the full cylinder operation mode to be shorter than the period of time for inhibiting the switchover of the full cylinder operation mode to the partial cylinder operation mode.

According to the invention, when the partial cylinder operation mode is selected during the idling, the partial cylinder operation mode may be inhibited if there are external disturbances to reduce the engine speed.

The partial cylinder operation mode may be also inhibited when it is selected during the activation of the air-conditioner or the power steering, or when the engine speed is abruptly reduced for some reason.

When the engine is returned to its previous operation mode immediately after it is set to the partial or full cylinder operation mode, the hydraulic control unit prevents the switchover operation so as to keep the engine in the current operation mode. Thus, the valve systems can maintain their current operation status.

When the air-conditioner is active during the operation of the engine, the full or partial cylinder operation mode is selected based on the map which differs from the map used to select the operation mode during non-actuation of the air-conditioner and in which the selection of the full or partial cylinder operation mode is determined depending upon the volume efficiency raised by the actuation of the air-conditioner.

When the engine is idling at a low speed where its operation becomes unstable, the full cylinder operation will be preferred.

Further, when the throttle valve is further opened for the acceleration during the partial cylinder operation mode, the engine is switched over to the full cylinder operation mode by calculating the variation of the throttle opening based on a signal from the throttle position sensor and by comparing the calculated value with the predetermined reference value. When the calculated value is above the reference value, the valve systems will be actuated so as to select the full cylinder operation mode.

When a command for the partial cylinder operation mode is received, the control unit checks whether the idle switch is active or inactive, and determines an engine speed for the operation mode to be selected. When the current engine speed is above the predetermined value, the control unit judges that no vibrations will be generated and allows the engine to assume the partial cylinder operation mode so as to accomplish fuel saving.

DESCRIPTION OF THE PREFERRED EMBODIMENT

Figure 1:
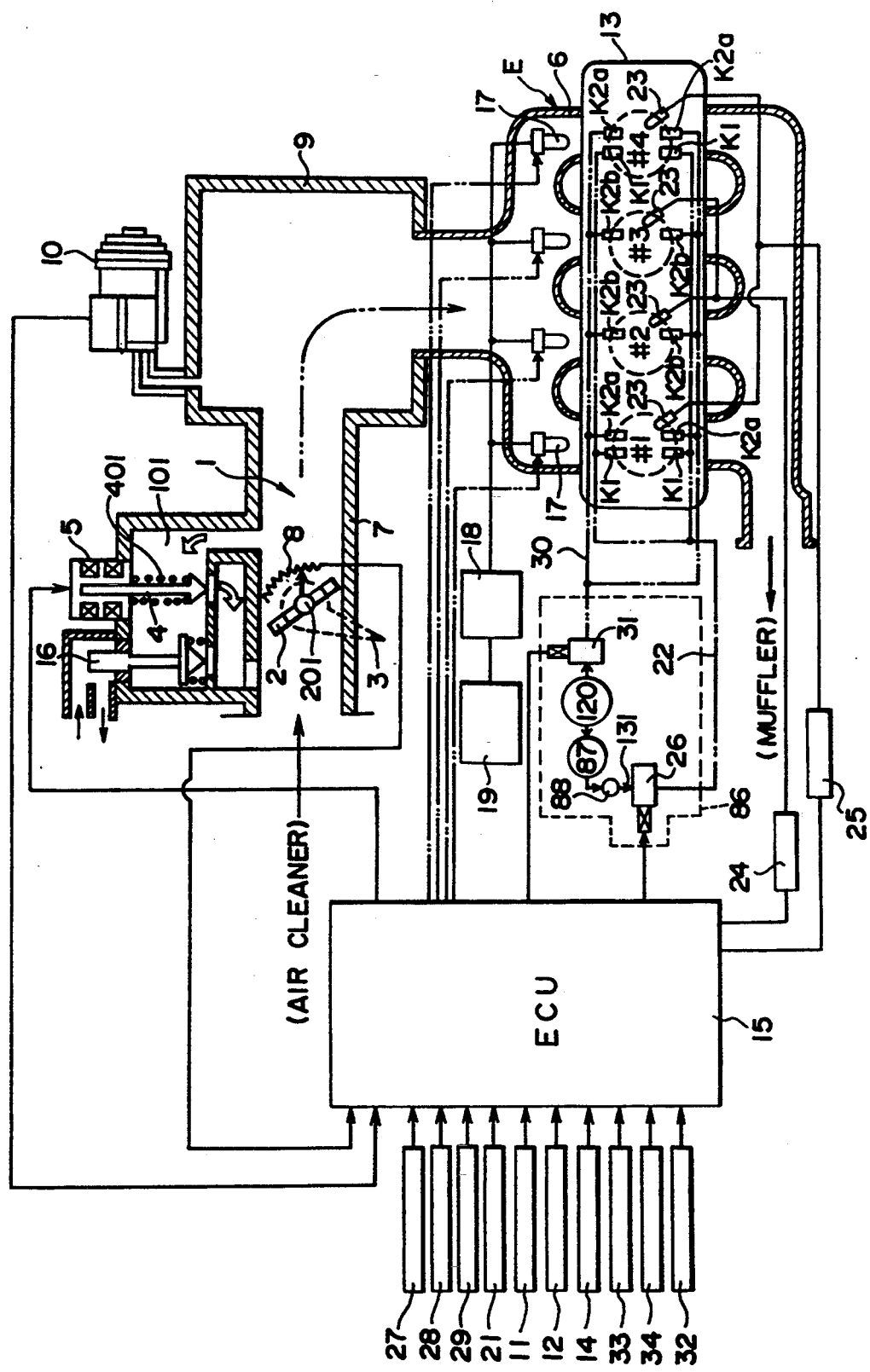
FIG. 1 is a schematic representation of an automobile engine according to one embodiment of the invention.
Figure 2:
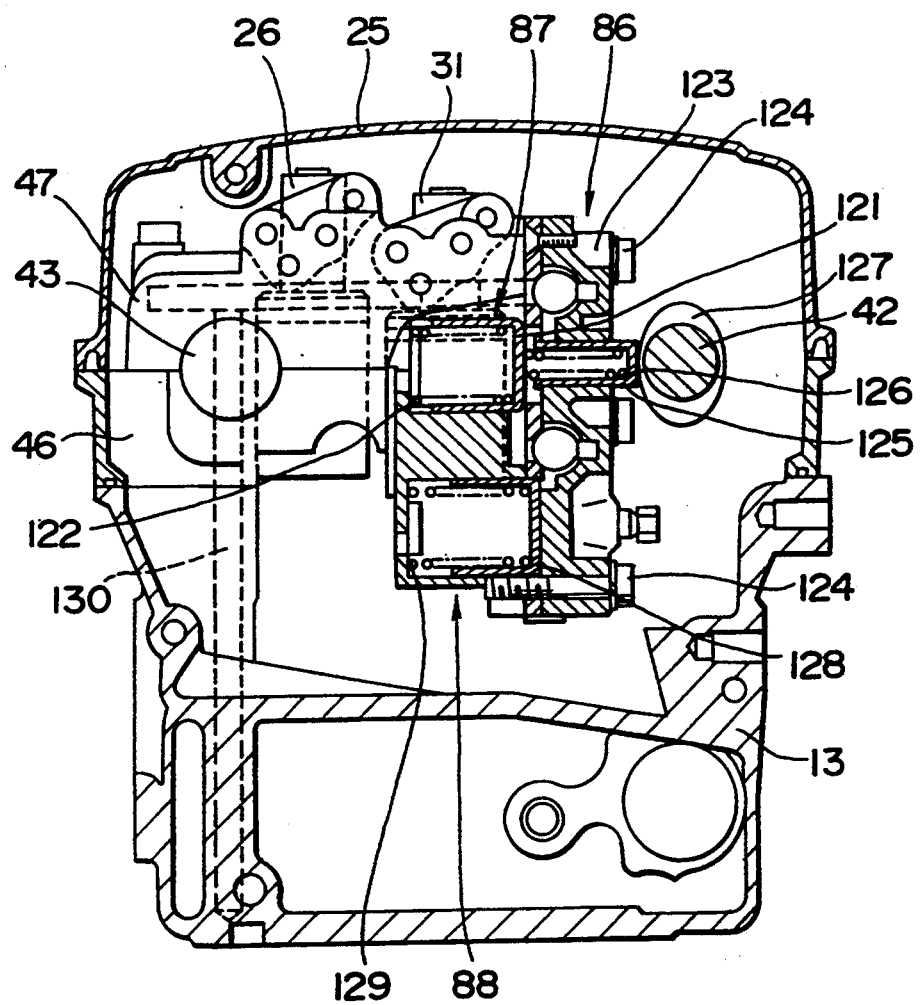
FIG. 2 is a cross section (taken along line II—II of FIG. 3) of the main part of a cylinder head where valve systems are mounted in the automobile engine according to the invention.

Referring to FIG. 1, a control unit according to the invention is applied to a 4-cylinder straight-type engine with an operation mode switchover mechanism (called "engine E" hereinafter).

In the engine E, an intake region 1 comprises an intake manifold 6, a surge tank 9 connected to the intake manifold 6, an intake pipe 7 integral with the surge tank 6, and an air cleaner (not shown). The inlet pipe 7 houses a throttle valve 2 which is rotatable therein. The throttle valve 2 is connected via its shaft 201 to a throttle lever 3 which is outside the intake region 1.

The throttle lever 3 is actuated in response to the operation of an accelerator pedal (not shown), thereby turning the throttle valve 2 counterclockwise in the plane shown in FIG. 1. The throttle valve 2 is urged to close by a return spring (not shown) when the accelerator cable is released. The throttle valve 2 has a throttle valve opening sensor 8 and an idle switch 27. The throttle valve opening sensor 8 provides data indicating an opening angle of the throttle valve 2. The idle switch 27 is turned on when the throttle valve 2 is fully closed.

An intake by-path 101 detouring the throttle valve 2 includes an idle speed control (ISC) valve 4 for controlling an idle speed of the engine. The ISC valve 4 is urged to close by a spring 401, and is activated by a stepper motor 5 as an actuator. A first idle air valve 16 automatically adjusts the warm-running of the idling engine according a temperature of cooling water. The ISC valve 4 has an ISC position sensor 28 for outputting data on a valve position.

The intake region 1 also includes an intake air temperature sensor 14 for providing data on an intake air temperature Ta. A cylinder block (not shown) includes a water temperature sensor 11 for detecting a temperature of the cooling water as the engine warm-running temperature, and a knocking sensor 21 for outputting knocking data. An ignition coil (not shown) is connected to an engine speed sensor 12, which detects an engine speed based on ignition pulses. An electric circuit (not shown) includes a battery sensor 34 for detecting a battery voltage VB. The surge tank 9 includes a manifold pressure sensor 10 for outputting inlet pipe data Pb. A crank shaft (not shown) of the engine E is provided with a crank angle sensor 33 for outputting crank angle data.

The automobile includes an air-conditioner switch 29 for turning on and off the air-conditioner in the passenger compartment, and a power steering switch 32 which is positioned near a power steering pump (not shown).

The cylinder head 13 of the engine E includes intake and exhaust paths communicating with the respective cylinders. These paths are opened and closed by intake and exhaust valves (not shown). Valve systems installed on the cylinder head 13 are designed to operate for the low and high speed modes of the engine, and will be described in detail later. When necessary, the valve systems allow the partial cylinder operation of the engine by interrupting the intake and exhaust valves associated with the cylinders #1 and #4 (which is called "two-cylinder operation" hereinafter). The cylinders #2 and #3 are always active when the engine is in operation. The valve systems include a switchover mechanism K1 which operates during the low-speed operation of the engine (called "low-speed switchover mechanism" hereinafter), and switchover mechanisms K2a and K2b which operate during the high-speed operation of the engine (called "high-speed switchover mechanisms"). These switchover mechanisms K1, K2a and K2b engage and disengage rocker arms with and from rocker shafts via pins which are operated by a hydraulic cylinder, thereby selectively allowing the high- and low-speed cams to come into contact with and out of contact from the rocker arms.

The low-speed switchover mechanism K1 receives pressured oil from a hydraulic circuit 22 via a first solenoid valve 26. The high-speed switchover mechanisms K2a and K2b receive the pressured oil from a hydraulic circuit 20 via a second solenoid valve 31. The solenoid valves 26 and 31 are three-way valves. When the engine is operating at a low speed by using the low-speed cams, both the first and second solenoid valves 26 and 31 are inoperative. On the contrary, when the engine is operating at a high speed by using the high-speed cams, the solenoid valves 26 and 31 are operative. In the two-cylinder operation mode, the first solenoid valve 26 is operative while the second solenoid valve 31 remains inoperative. These solenoid valves are controlled by an engine control unit (ECU) 15 to be described later.

Fuel injectors 17 are connected to the cylinder head 13 (FIG. 1) so as to inject fuel to the respective cylinders. Specifically, the fuel injectors 17 receive from a fuel reservoir 19 fuel whose pressure is adjusted by a fuel pressure adjustor 18. The fuel injection is controlled by the ECU 15.

The cylinder head 13 also includes ignition plugs 23 for the respective cylinders. The ignition plugs 23 for the cylinders #2 and #3 are connected together to an igniter 24 of an ignition circuit. The ignition plugs 23 for the cylinders #1 and #4 are connected together to an igniter 25. The igniters 24 and 25 are controlled by the ECU 15.

The operation of the valve systems will be described with reference to FIGS. 2 to 12.

Referring to FIGS. 4 to 6 and 12, the cylinder head 13 has along its length an intake cam shaft 42 and an exhaust cam shaft 43. The cam shafts 42 and 43 are juxtaposed on the cylinder head 13, and respectively have as integral parts low speed cams 44 with a small lift and high speed cams 45 with a large lift. The low and high speed cams 44 and 45 are provided for the respective cylinders. The cam shafts 42 and 43 are sandwiched between an upper part of a cam shaft housing 46 and a plurality of cam caps 47, and are supported on the cylinder head 13 via bolts 48 and 49 so as to be rotatable on the cylinder head 13.

The cylinder head 13 also includes intake rocker shafts 51 and exhaust rocker shafts 52. These rocker shafts 51 and 52 are in parallel to the cam shafts 42 and 43. One intake rocker shaft 51 and one exhaust rocker shaft 52 are provided for each cylinder. The rocker shafts 51 and 52 are sandwiched between undersides of cam shaft housings 46 and a plurality of rocker shaft caps 53, are attached to the underside of the cylinder head 13 via bolts 49 and 54, so that the rocker shafts 51 and 52 are rotatable on the cylinder head 13. A cylinder head cover 55 covers the upper side of the cylinder head 13.

Figure 12:
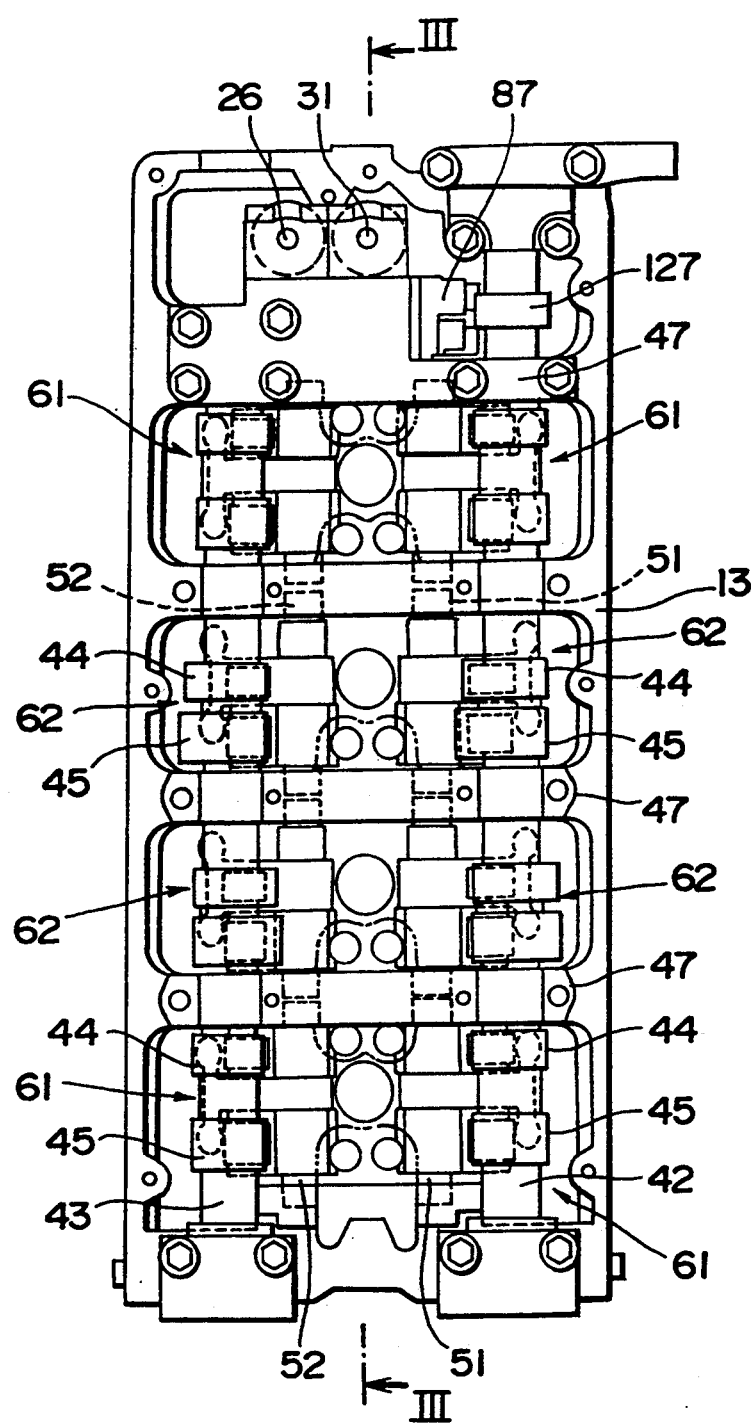
FIG. 12 is a plan view of the cylinder head.

Each of the rocker shafts 51 and 52 is provided with valve systems for selecting a timing for the high speed engine operation or for the low speed engine operation, and valve systems for selecting timings for the high or low speed engine operation and disconnecting the specified cylinders during the low load operation of the engine. As shown in FIG. 12, the valve systems 61 are associated with the cylinders (shown at the upper and lower parts of FIG. 12) and can disconnect the these cylinders if necessary, while the valve systems 62 serve for the remaining cylinders (shown at the center of FIG. 12) and do not have the foregoing disconnecting function.

Figure 7:
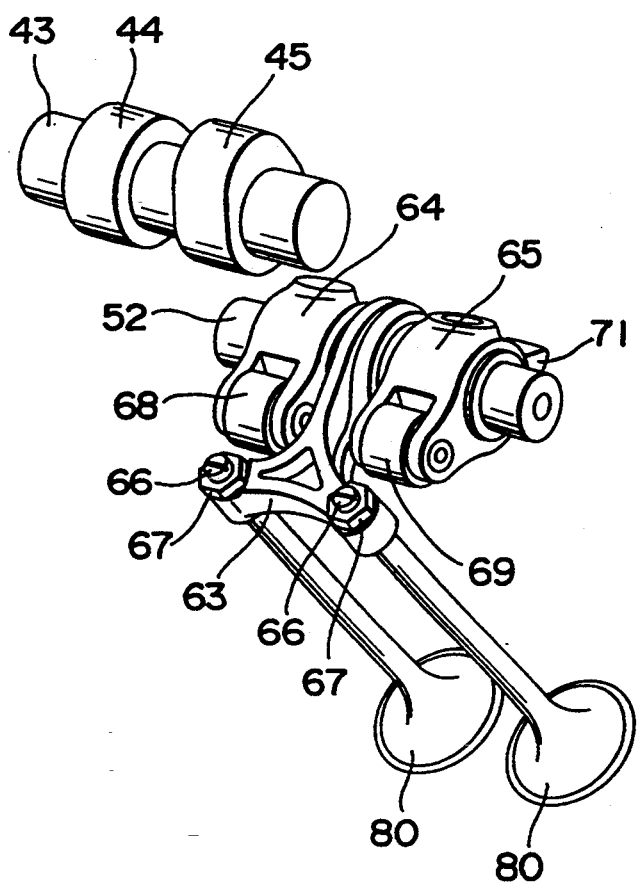
FIG. 7 is an exploded view of the valve system.

The valve system 61 will be described first. Referring to FIG. 7, the exhaust rocker shaft 52 includes T-shaped lever 63 extending substantially perpendicularly from the center thereof. The T-shaped lever 63 serves as an exhaust arm 52a. The intake rocker shaft 51 includes another T-shaped lever 63 which is similar to that of the exhaust rocker shaft 52. Specifically, the exhaust rocker shaft 52 also includes low and high speed rocker arms 64 and 65 as sub-rocker arms, which are on opposite respective sides of the T-shaped lever 63. The exhaust rocker arm 52a is integral with the rocker shaft 52 at its base, and has adjust screws 66 attached by adjust nuts 67 at the rocking ends thereof. The adjust screws 67 are in contact with heads of exhaust valves 80 (to be described later) at the other ends thereof.

The low speed rocker arm 64 is pivotally supported around the rocker shaft 52 at the base thereof, and has a roller bearing 68 rotatably supported at the other end thereof. The roller bearing 68 is designed to come into contact with the low speed cam 44. The high speed rocker arm 65 is pivotally supported around the rocker shaft 52 in a manner similar to the low speed rocker arm 64, and has a roller bearing 69 rotatably supported at the rocking end thereof. The roller bearing 69 comes into contact with the high speed cam 45.

Figure 6:
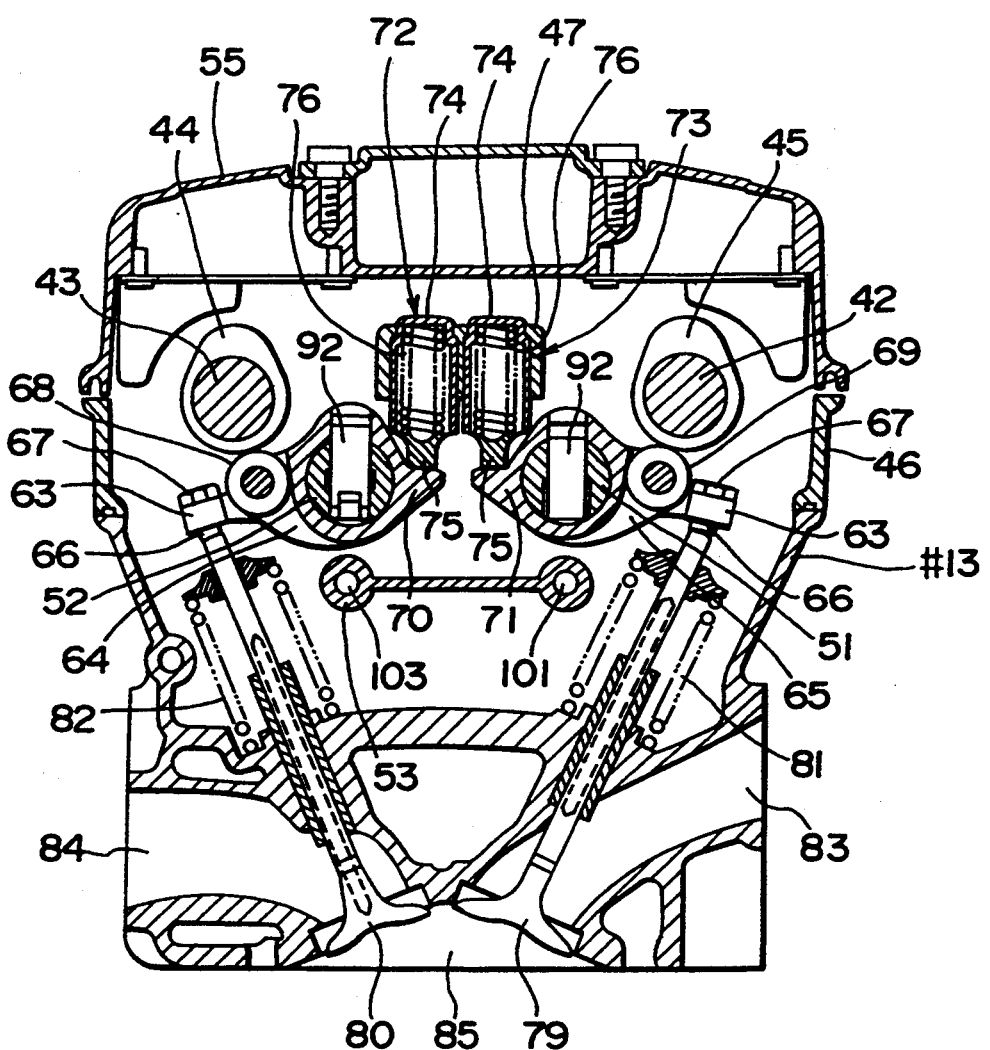
FIG. 6 is a cross section of the valve system, taken along line VI—VI of FIG. 4.

Referring to FIG. 6, each low speed rocker arm 64 has a projection 70, as an integral part, at the side opposite to the roller bearing 68. Similarly, each high speed rocker arm 65 has a projection 71, as an integral part, at the side opposite to the roller bearing 69. A spring 72 operates on the projection 70, while a spring 73 operates on the projection 71. Each of the springs 72 and 73 includes a cylinder 74 fixed to the cam cap 47, a plunger 75 and a compression spring 76. The plungers 75 push their associated projections 70 and 71, thereby urging the clockwise movement of the rocker arms 64 and 65 shown at the left side in FIG. 6, and the counterclockwise movement of the rocker arms 64 and 65 shown at the right side in FIG. 6.

Normally, the spring 72 urges the low speed rocker arm 64 to be in contact with the low speed cam 44 of the cam shaft 43 via the roller bearing 68, while the spring 73 urges the high speed rocker arm 65 to be in contact with the high speed cam 45 of the cam shaft 43 via the roller bearing 69. The rotation of the cam shaft 43 allows the operation of the cams 44 and 45, which rock the low and high speed rocker arms 64 and 65, respectively.

Figure 8:
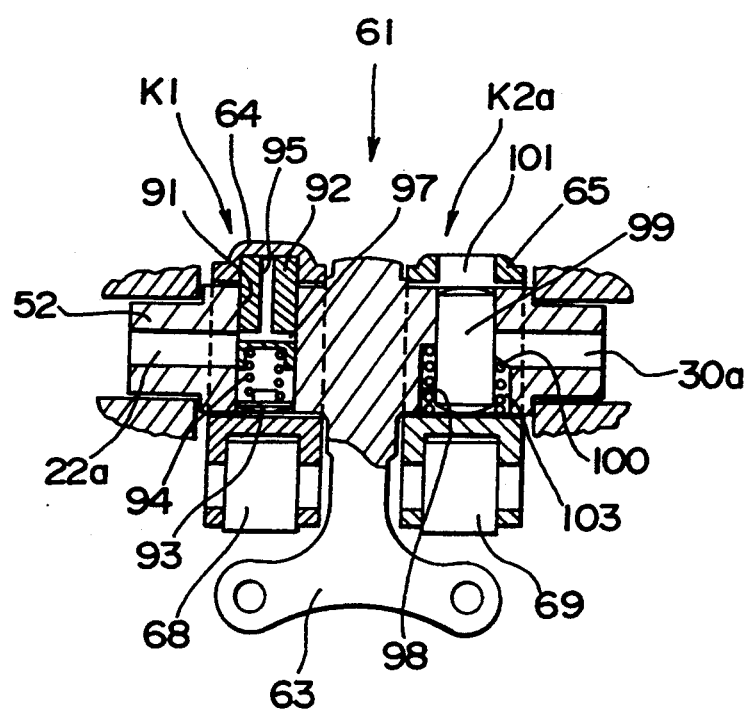
FIG. 8 is a cross section of a switchover mechanism of the valve system.
Figure 9:
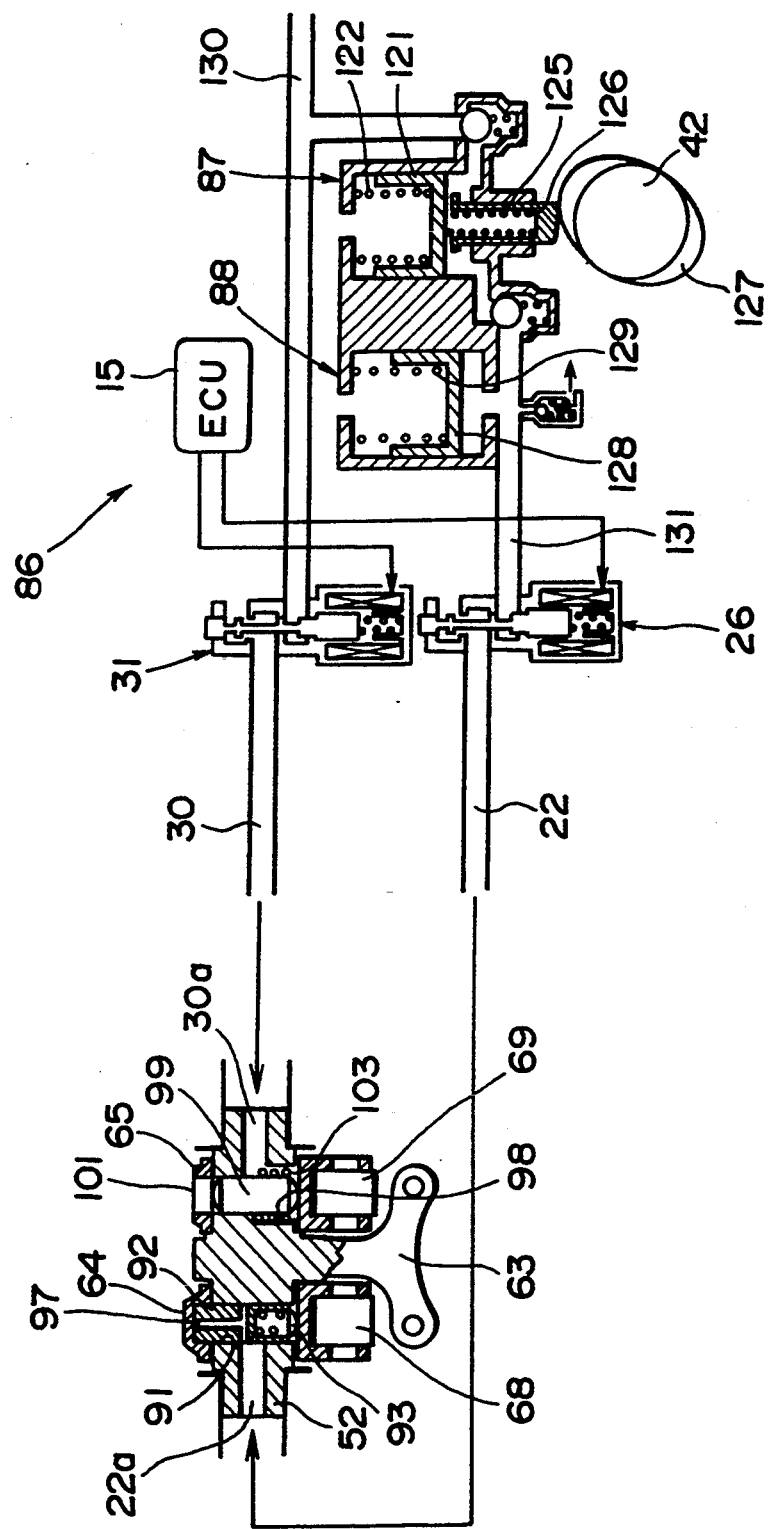
FIG. 9 shows a route for supplying pressured oil to the valve system.

As shown in FIG. 8, the switchover mechanisms K1 and K2a enable the low and high speed rocker arms 64 and 65 to be turned integrally with the rocker shaft 52. The rocker shaft 52 has a diametrical cavity 91 formed at a position associated with the low speed rocker arm 64. A rocking pin 92 is fitted in the cavity 91 to be movable therein. The rocking pin 92 is urged to one direction by a compression spring 94 supported on a spring sheet 93. The low speed rocker arm 64 has a recess 95 at a position associated with the upper end of the cavity 91 of the rocker shaft 52. The rocking pin 92 is urged by the compression spring 94 so as to fit in the recess 95. The rocker shaft 52 also has a pressured oil path 22a formed axially along its length. The rocking pin 92 communicates with the pressured oil path 22a, and has an oil gallery 97 which terminates at the recess 95 with which the rocking pin 92 is engaged.

The rocker shaft 52 also has a diametrical cavity 98 formed at a position associated with the high speed rocker arm 65. A rocking pin 99 is movably fitted in the cavity 98, and is unidirectionally urged by a compression spring 100. The high speed rocker arm 65 has a recess 101 at a position associated with the upper end of the cavity 98 of the rocker shaft 52. The rock pin 99 disengages itself from the recess 101 by the compression spring 100. The rocker shaft 52 has a pressured oil path 30a formed axially, thereby constituting an oil gallery 103 extending to a side opposite to the recess 101.

Figure 10A:
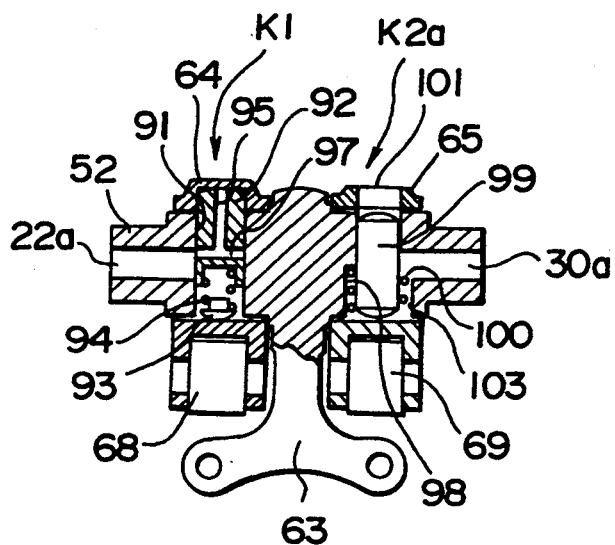
FIG. 10(a) shows the operation of the switchover mechanism when it is operated during low speed operation of the engine.

Referring to FIG. 10(a), the low speed rocker arm 64 is usually engaged with the rocker shaft 52 since the rocking pin 92 is held in the recess 95 by the compression spring 94, so that the low speed rocker arm 64 can turn with the T-shaped lever 63 via the rocker shaft 52. On the other hand, since the rocking pin 99 urged by the compression spring 100 disengages itself from the recess 101, the high speed rocker arm 5 is disengaged from the rocker shaft 52 and does not turn with the rocker shaft 52. Therefore, although the high and low speed cams 44 and 45 rock the low and high speed rocker arms 64 and 65, only the driving force transmitted via the low speed rocker arm 64 rocks the T-shaped lever 63.

The pressured oil is supplied to the pressured oil paths 22a and 30a of the rocker shaft 52. When, the pressured oil flows to the recess 95 of the low speed rocker arm 64 via the oil gallery 97, thereby disengaging the rocking pin 92 from the recess 95 against the compression spring 94. The low speed rocker arm 64 is disengaged from the rocker shaft 52, and does not turn with the rocker shaft 52. On the other hand, the pressured oil flows to the side opposite to the recess 101 of the high speed rocker arm 65, thereby engaging the rocking pin 99 in the recess 101 against the compression spring 94. Thereafter, the high speed rocker arm 65 is engaged with the rocker shaft 52, turning together with the rocker shaft 52. Therefore, the low and high speed cams 44 and 45 rock the low and high speed rocker arms 64 and 65, respectively. Then, only the driving force transmitted via the high speed rocker arm 65 is delivered to the T-shaped lever 63 via the rocker shaft 52, thereby rocking the T-shaped lever 63.

Figure 10B:
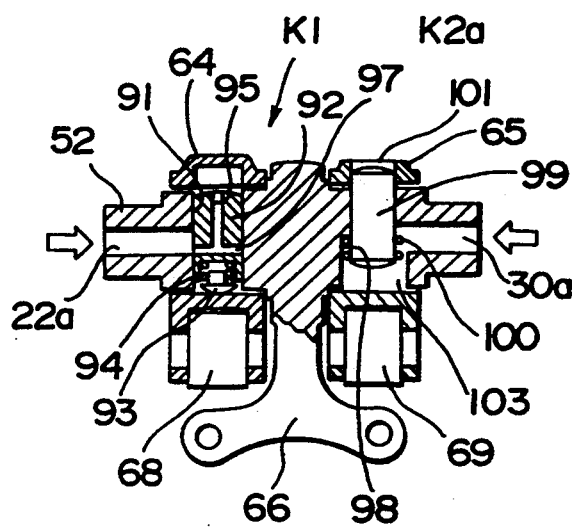
FIG. 10(b) is a view similar to FIG. 10(a) when the switchover mechanism is operated during high speed operation of the engine.
Figure 10C:
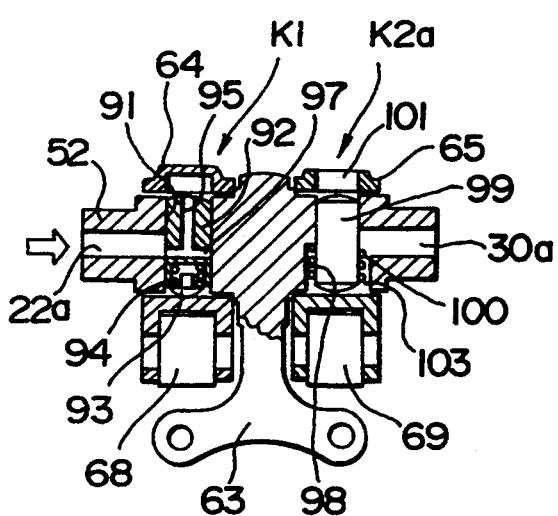
FIG. 10(c) is a view similar to FIG. 10(a) when the switchover mechanism is operated during the partial cylinder operation of the engine.

When the pressured oil is supplied only to the pressured oil path 22a of the rocker shaft 52, it flows to the recess 95 of the low speed rocker arm 64 as shown in FIG. 10(c), thereby disengaging the rocking pin 92 from the recess 95. Thus, the low speed rocker arm 64 is disengaged from the rocker shaft 52, and does not turn with the rocker shaft 52. As for the high speed rocker arm 65, the rocking pin 99 is disengaged from the recess 101 by the compression spring 100, disengaging the high speed rocker arm 65 from the rocker shaft 52. The high speed rocker shaft 65 does not turn with the rocker arm 52. Therefore, the low and high speed cams 44 and 45 rock the low and high speed rocker arms 64 and 65, and no driving force is transmitted to the rocker shaft 52, preventing the operation of the T-shaped lever 63, and allowing the associated cylinders to remain inactive.

In each valve system 62 without the cylinder disconnecting mechanism, the exhaust rocker shaft 52 includes a T-shaped lever (L) 104 extending substantially vertically from the center thereof. The T-shaped lever (L) 104 functions as an arm 52a. The exhaust rocker shaft 52 also has a high speed rocker arm 105 rotatably supported thereon. The T-shaped lever (L) 104 has at its one end a roller bearing 106 to be in contact with the low speed cam 44, and has adjust screws 107 attached by adjust nuts 108. The lower ends of the adjust screws 107 are in contact with heads of exhaust valves 80.

The high speed rocker arm 105 is rotatably supported on the rocker shaft 52 at the base thereof, and has a roller bearing 109 at the other end thereof. The high speed cam 45 is designed to come into contact with the roller bearing 109. The high speed rocker arm 105 has a projection 110 as an integral part at the side opposite to the roller bearing 109. A spring 111 operates on the projection 110 so as to urge the high speed rocker arm 105 unidirectionally. Further, the high speed rocker arm 105 is structured to turn integrally with the rocker shaft 52 by the switchover mechanism K2b. In other words, the rocker shaft 52 has a cavity 113 at a position associated with the high speed rocker arm 105. A rocking pin 114 is movably fitted in the cavity 113, and is urged by a compression spring 115. The high speed rocker arm 105 also has a recess 116, from which the rock pin 114 is disengaged by the force of the compression spring 115. The rocker shaft 52 has a pressured oil path 30b formed axially therein, which communicates with the cavity 113. The rocker shaft 52 has an oil gallery 118 formed at the side opposite to the recess 116 of the rocker arm 105.

In the high speed rocker arm 105, the rocking pin 114 is usually disengaged from the recess 116 by the force of the compression spring 115, so that the high speed rocker arm 105 is disengaged from the rocker shaft 52, and does not turn with the rocker shaft 52. Therefore, the low and high speed cams 44 and 45 rock the T-shaped lever (L) 104 and the high speed rocker arm 105, and the driving force of the low speed cam 44 is transmitted to the exhaust valves 80 to operate them. When the pressured oil is supplied to the pressured oil path 30b of the rocker shaft 52, it flows in the high speed rocker arm 105 to the side opposite to the recess 116, thereby engaging the rock pin 114 in the recess 116. Then, the high speed rocker arm 105 is engaged with the rocker shaft 52, turning with the rocker shaft 52. Thus, the high speed cam 45 rocks the high speed rocker arm 105, of which driving force is transmitted to the exhaust valves 80 via the T-shaped lever (L) 104 so as to operate the exhaust valves 80.

The foregoing description mainly relates to the operation of the valve systems 61 and 62 associated with the exhaust valves. The valve systems for the intake valves are similar to those mentioned above. In the valve systems for the intake valves, the cams 44 and 45 are positioned on the circumference of the cam shafts 42 and 43 according to the intake valve operation timings.

Referring to FIG. 6, the intake and exhaust valves 79 and 80 are movably supported on the cylinder head 13, and close intake ports 83 and exhaust ports 84 by valve springs 81 and 82. The actuation of the T-shaped lever 63 (lever (L) 104) pushes the upper parts of the intake and exhaust valves 79 and 80 so as to open and close the intake and exhaust ports 83 and 84, which are in communication with and out of communication from combustion chambers 85.

As shown in FIGS. 1 to 3, 9 and 12, a hydraulic control unit 86 is disposed at the rear side (at the upper part in FIG. 12) of the cylinder head 13 so as to operate the switchover mechanisms K1, K2a and K2b of the valve systems 61 and 62. The hydraulic control unit 86 comprises an oil pump 87, an accumulator 88 and the second and first solenoid valves 31 and 26.

The oil pump 87 and the accumulator 88 are positioned between the intake and exhaust cam shafts 42 and 43. The oil pump 87 is positioned just above the accumulator 88 with the axis thereof kept parallel to that of the accumulator 88. A cylinder 121 of the oil pump 87 is supported by the force of a compression spring 122 on an upper side part of the rearmost cam cap housing 46 and on an upper side part of the cam cap 47 of the cylinder head 13, and is fixed by a bolt 124 via the cover 123, so that the cylinder 121 is horizontally movable. A plunger 126 operates one the cylinder 121 via a compression spring 125. The plunger 126 is actuated by an oil pump cam 127 which is integral with one end of the intake cam shaft 42.

A cylinder 128 of the accumulator 88 is supported by the force a compression spring 129 on a lower side part of the cam cap housings 46 and a lower side part of the cam caps 47, and fixed by a bolt 124 via the cover 123, so that the cylinder 128 is horizontally movable. The cylinders 121 and 128 have the same diameter, and may be composed of the same components. Both the second and first solenoid valves 31 and 26 are mounted on the cylinder head 11.

As shown in FIGS. 1 to 3 and 9, the second solenoid valve 31 is directly connected to a main oil pump 120 of the engine via the oil path 130, and to the pressured oil path 30a via the hydraulic circuit 30. The first solenoid valve 26 is connected to the accumulator 88, oil pump 87 and main oil pump 120 via the oil gallery 131 and to the pressured oil path 22a via the hydraulic circuit 22. The solenoid valves 26 and 31 are actuated in response to control signals from the ECU 15.

Figure 3:
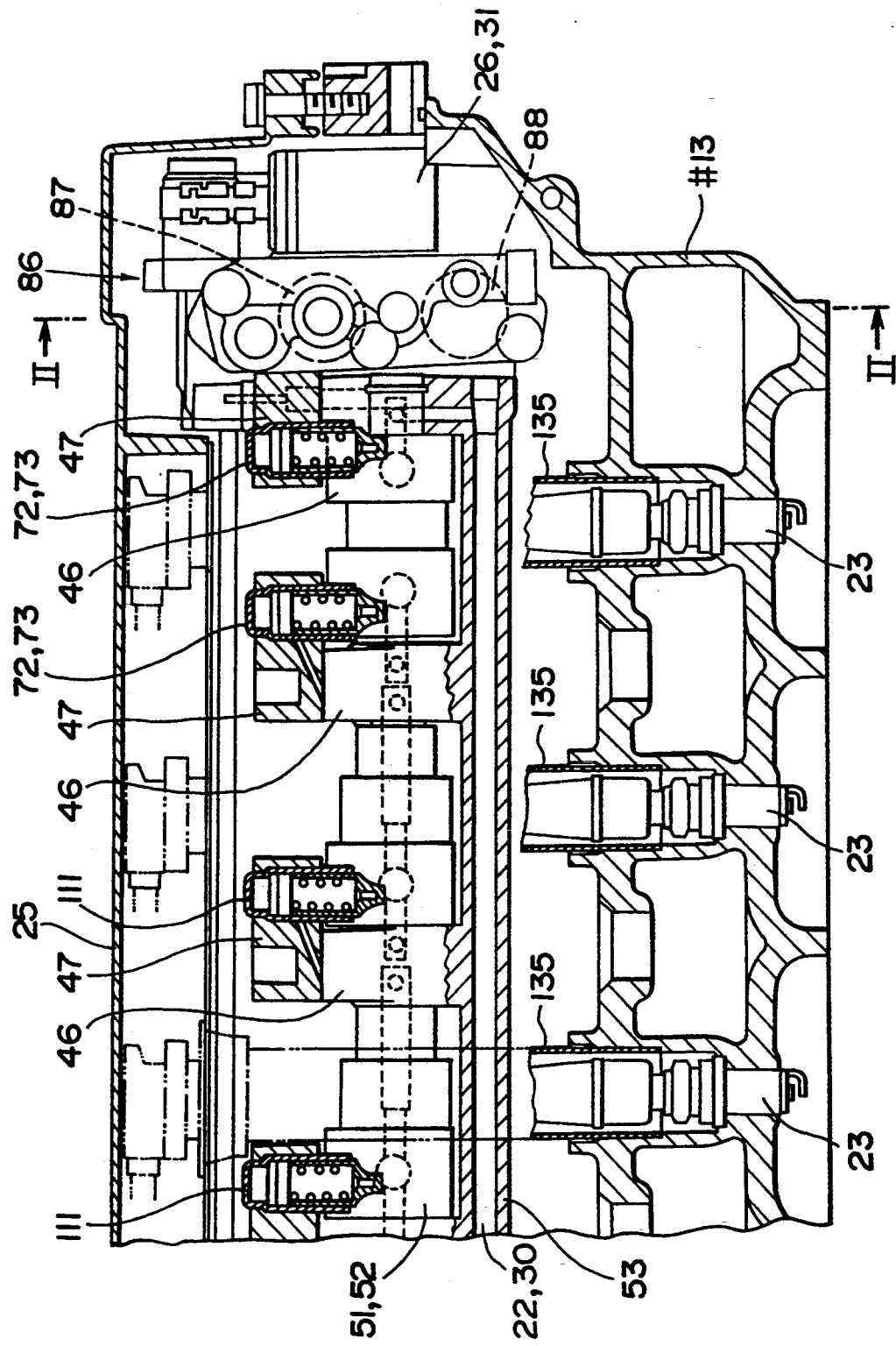
FIG. 3 is a cross section (taken along line III—III of FIG. 12) of the central part of the cylinder head.
Figure 4:
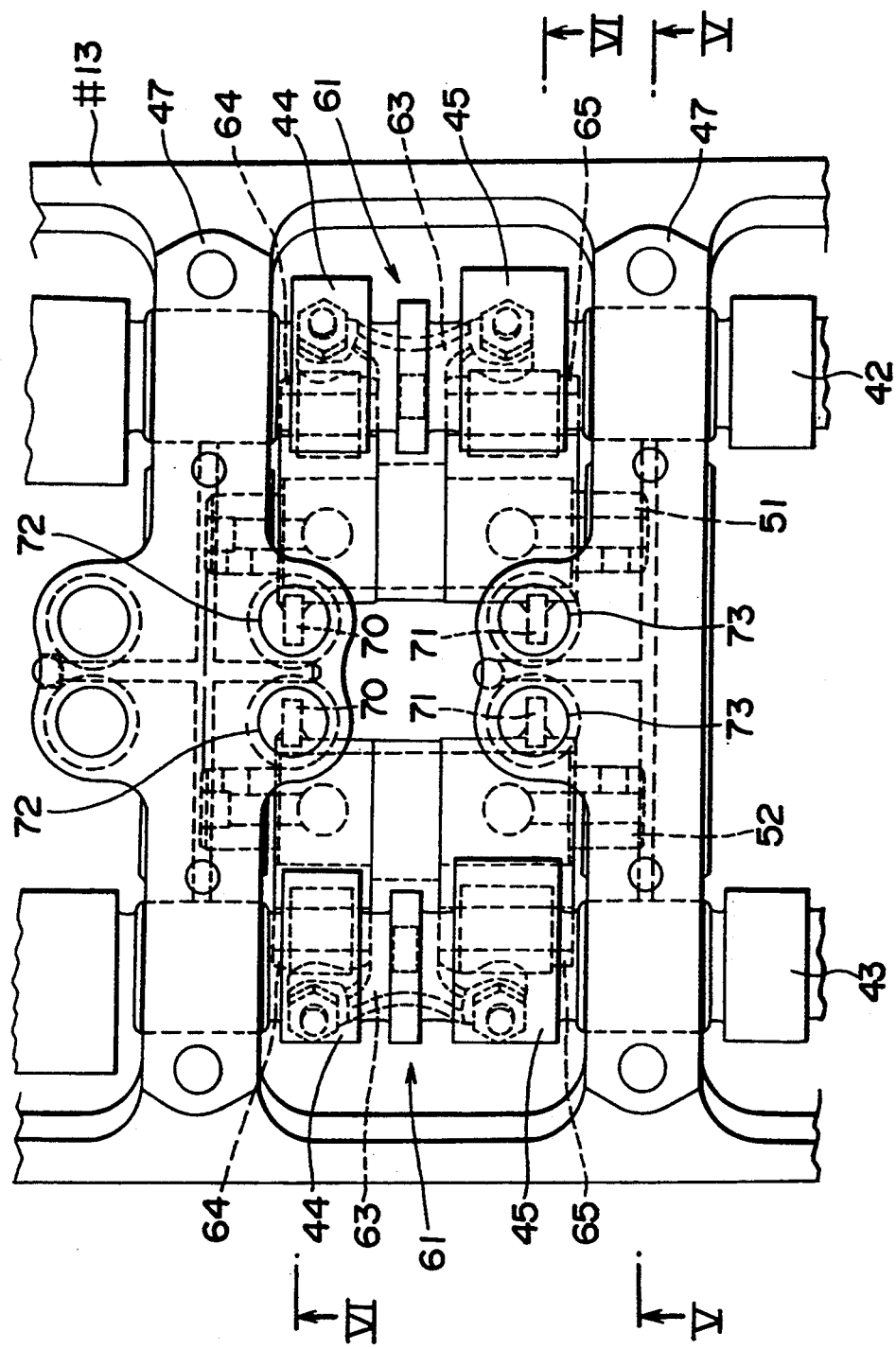
FIG. 4 is a plan view of a valve system having a valve interrupting mechanism.
Figure 5:
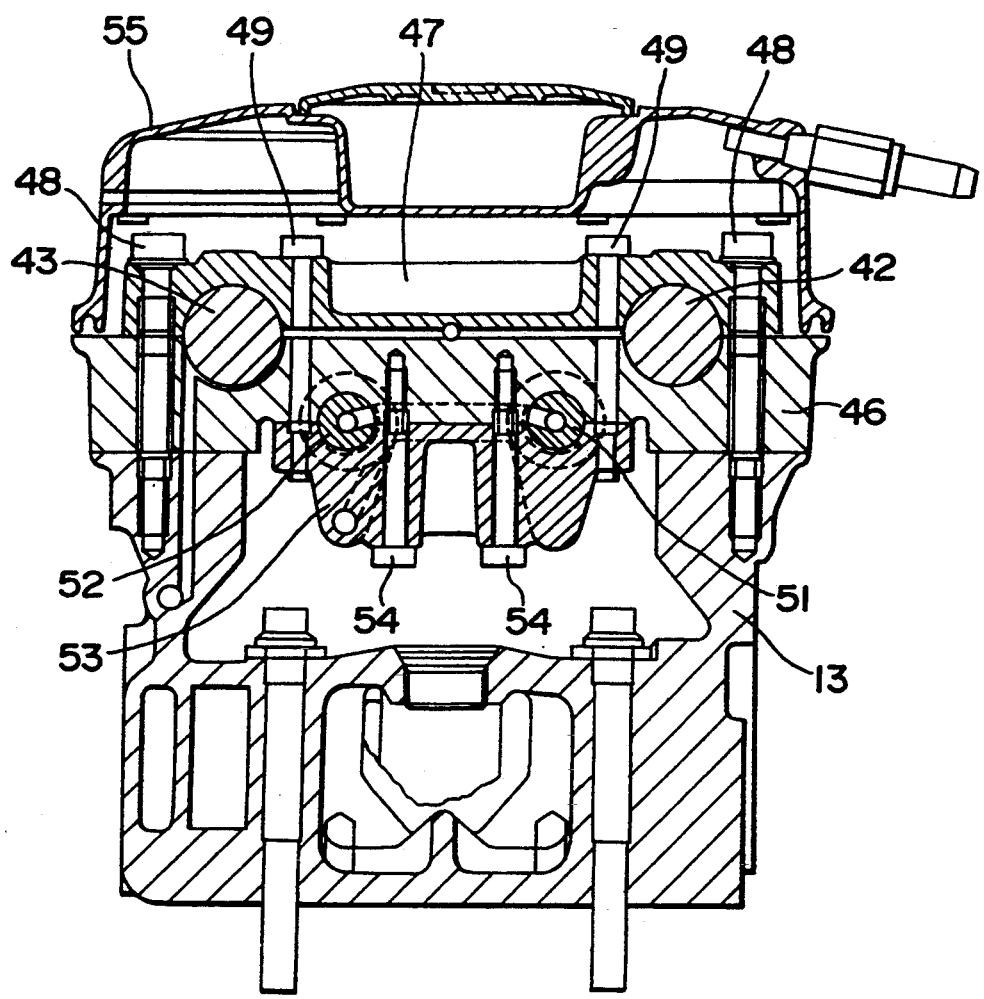
FIG. 5 is a cross section of the valve system, taken along line V—V of FIG. 4.

The switchover mechanism K2b of the valve system 62 is actuated by the hydraulic control unit 86 similarly to the switchover mechanism K2b of the valve system 61. The second solenoid valve 31 is coupled to the pressured oil path 30b of the rocker shaft 52 via the hydraulic circuit 30. As shown in FIG. 3, the cylinder head 13 includes hollow plug tubes 135 for the respective cylinders. The ignition plugs 23 are housed in respective plug tubes 135, which reach into the combustion chambers 85.

Figure 11:
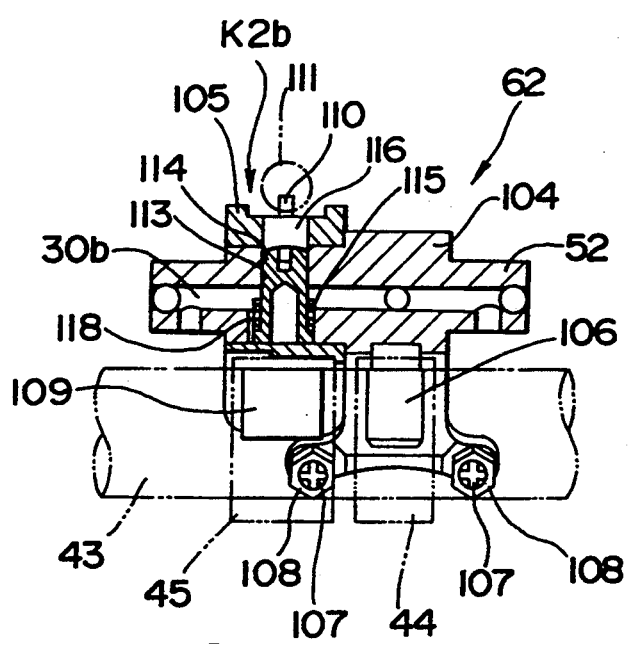
FIG. 11 is a cross section of a valve system without a valve interrupting mechanism.

The operation of the four-cylinder engine will be described hereinafter. The ECU 15 judges an operating condition of the engine based on data obtained from various sensors. When the engine is in the low speed operation mode, the ECU 15 selects the cam profile suitable for that mode. In this case, the ECU 15 provides a control signal to the solenoid valves 26 and 31 so as to close them. No pressured oil is supplied to the pressured oil paths 22a, 30 and 30b. In the valve system 61, as shown in FIG. 10(a), the low speed rocker arm 64 is engaged with the rocker shaft 52 via the rocking pin 92, so that the high speed rocker arm 65 is disengaged from the rocker shaft 52. When the cam shafts 42 and 43 rotate, the low speed cam 44 rocks the low speed rocker arm 64. The driving force is transmitted from the low speed rocker arm 64 to the T-shaped lever 63 via the rocker shaft 52. Then, a pair of adjust screws 66 at the rocking end of the T-shaped lever 63 actuate the intake and exhaust valves 79 and 80. On the other hand, in the valve system 62, the high speed rocker arm 105 is disengaged from the rocker shaft 52 as shown in FIG. 11. When the cam shafts 42 and 43 rotate, the low speed cam 44 rocks the T-shaped lever (L) 104. A pair of adjust screws 107 at the rocking end of the lever (L) 104 actuate the intake and exhaust valves 79 and 80 at a timing for the low speed engine operation, thereby allowing the low speed operation of the engine.

When detecting the high speed operation mode of the engine, the ECU 15 provides another control signal to the solenoid valves 26 and 31 so as to open them. Then, the pressured oil is supplied to the pressured oil paths 22a, 30a and 30b. During the high speed operation of the engine, in the valve system 61, the rocking pin 92 is disengaged from the recess 95 of the low speed rocker arm 64 by the pressured oil, so that the low speed rocker arm 64 is disengaged from the rocker shaft 52, as shown in FIG. 10(b). Then, the rocking pin 99 is engaged with the recess 101, so that the high speed rocker arm 65 is engaged with the rocker shaft 52. The high speed cam 45 rocks the high speed rocker arm 65, thereby rocking the T-shaped lever 63 so as to actuate the intake and exhaust valves 79 and 80. On the other hand, in the valve system 62, the rocking pin 114 is engaged with the recess 116 by the pressured oil, so that the high speed rocker arm 105 is engaged with the rocker shaft 52. Then, the high speed cam 45 rocks the high speed rocker arm 105, which actuates the intake and exhaust valves 79 and 80. The intake and exhaust valves 79 and 80 are actuated at the timing for the high speed operation of the engine.

Figure 13:
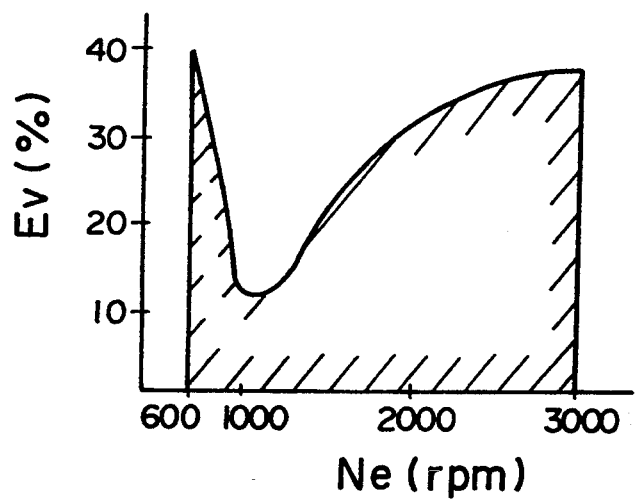
FIG. 13 is a map used by an ECU of the automobile engine of FIG. 1.
Figure 14:
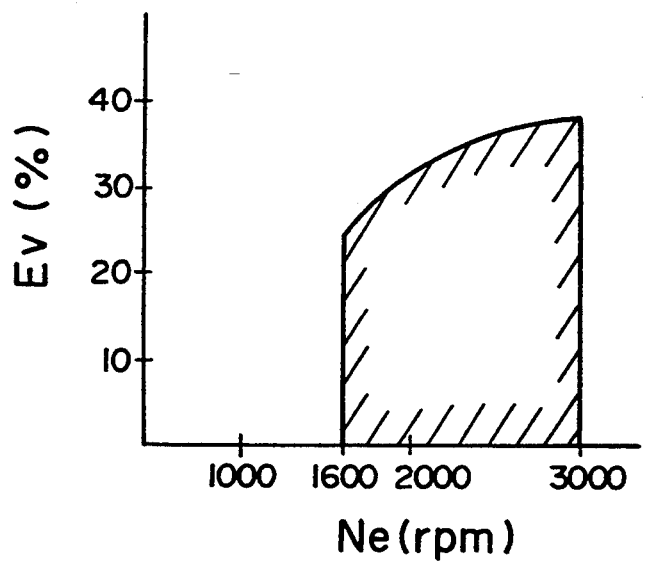
FIG. 14 is another map used by the ECU of the automobile engine of FIG. 1.

The ECU 15 controls the valve systems for the four-cylinder or two-cylinder operation of the engine according to the map shown in FIG. 13 or FIG. 14.

When the idle switch 27 is active, the map of FIG. 13 is used to judge either the four-cylinder or two-cylinder operation mode in the entire engine operation range, and is plotted based on the volume efficiency (Ev) and the engine speed (Ne). In FIG. 13, the shaded portion represents the two-cylinder operation range of the engine.

In the map, the border between the four-cylinder and two-cylinder operation ranges is set assuming that an output is obtained according to the engine speed and a load calculated from the volume efficiency. Referring to FIG. 13, the volume efficiency is momentarily increased in a low speed range so that the engine speed is temporarily raised to prevent its abrupt reduction at the time of the two-cylinder operation mode when the four-cylinder operation mode is switched over to the two-cylinder operation mode.

The ECU 15 performs the following processing when the two-cylinder operation mode is selected while the engine is idling after its activation but not while the engine is decelerated by releasing the throttle valve.

The ECU 15 refrains from selecting the two-cylinder operation mode if there are external disturbances such as ON/OFF signals for the switches of the air-conditioner and power steering mechanism which vary loads applied to the engine, i.e. reduce the idle speed of the engine, and when the engine speed is abnormally decelerated for some reason. In other words, the ECU 15 performs this processing according to logic OR's of the factors mentioned above.

Figure 17:
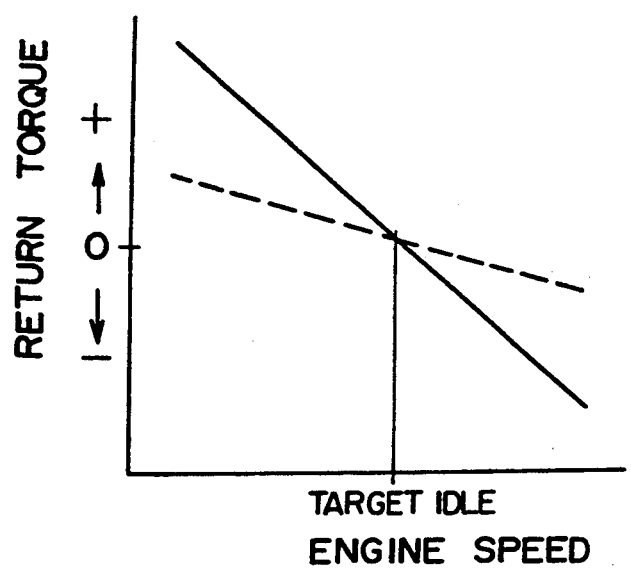
FIG. 17 is a plot diagram showing the relationship between the engine speed and the return torque which are necessary to maintain an engine speed to cope with a load applied during the full or partial cylinder operation mode of the engine.

As shown in FIG. 17, the return torque of the engine is weak in the two-cylinder operation mode compared with that in the four-cylinder operation mode. Furthermore, when an engine load varies, the engine is relatively slow to return to its normal condition in the two-cylinder operation mode, and would suffer from an unstable idle speed or stall.

When the idle switch 27 is inactive, the ECU 15 controls the valve systems so as to select the two-cylinder or four-cylinder operation mode according to the map shown in FIG. 14.

The map of FIG. 14 is a modification of the map of FIG. 13, and is used for checking the two-cylinder or four-cylinder operation mode of the engine when the engine is operating in the predetermined speed range with the idle switch 27 turned off.

In the maps of FIGS. 13 and 14, the conditions for selecting the two-cylinder operation mode are variable according to the active or inactive state of the idle switch 27. Specifically, to select the two-cylinder operation mode, minimum engine speeds where the automobile suffers from excessive vibrations are predetermined according to the active and inactive states of the idle switch 27. When the two-cylinder operation mode is required, the map of FIG. 13 or FIG. 14 is selectively used after comparing the current engine speed with the foregoing minimum speeds, and depending upon the active or inactive state of the idle switch.

In the map of FIG. 13, the minimum engine speed for selecting the two-cylinder operation mode is 600 rpm (when the idle switch 27 is active). In the map of FIG. 14, the minimum engine speed is 1,600 rpm (when the idle switch 27 is inactive).

Figure 15:
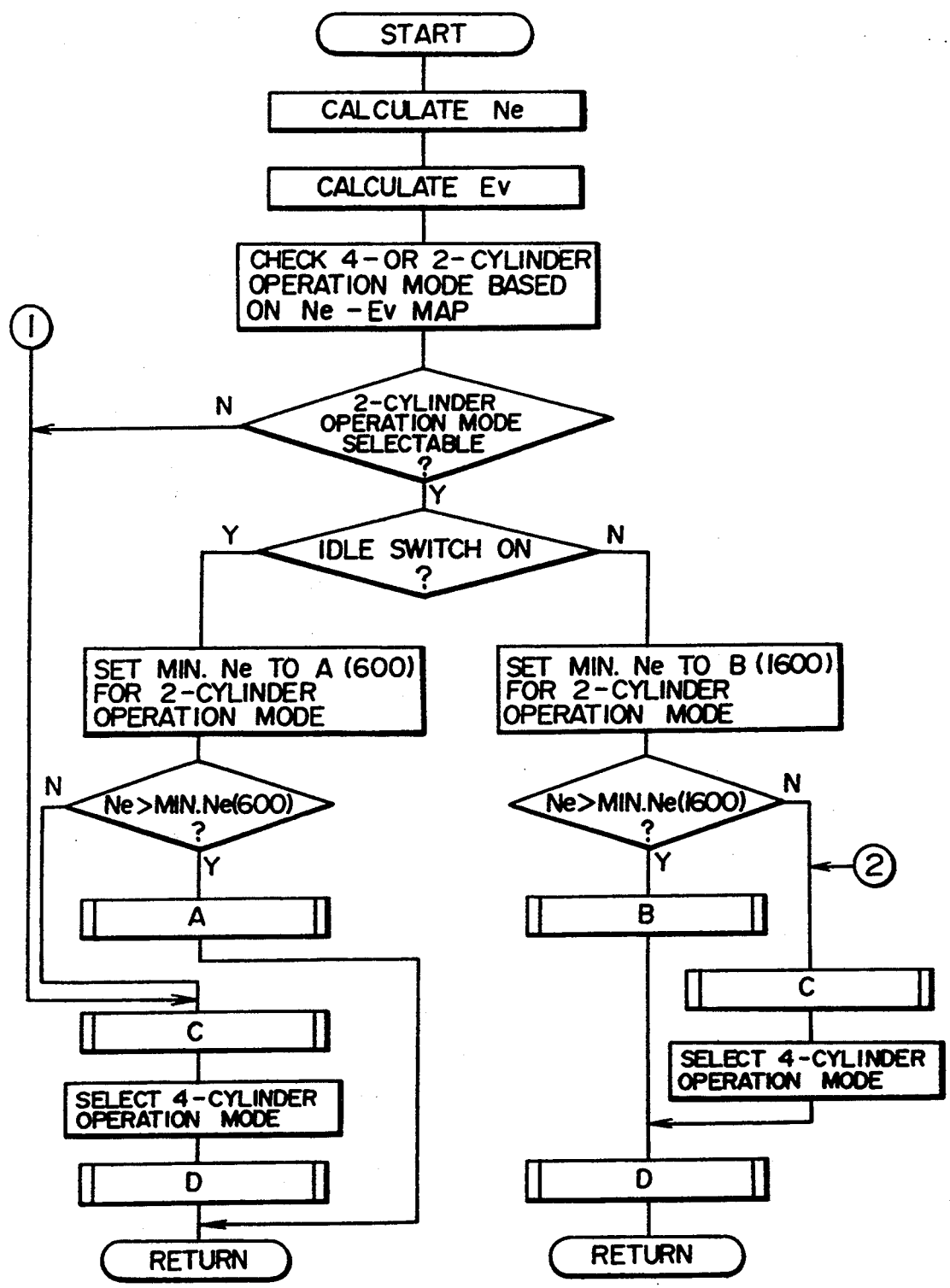
FIG. 15 is a flowchart showing the operation of the ECU of the automobile engine of FIG. 1.

The operation of the ECU 15 will be described with reference to the flowchart shown in FIG. 15.

When an engine speed (Ne) and volume efficiency (Ev), i.e. a boost pressure, are input, the ECU 15 checks whether the command for either the two-cylinder or four-cylinder operation mode should be issued according to the map of FIG. 13 or 14. Then, a drive signal is provided to the hydraulic control unit 86 according to the four- or two-cylinder operation mode. Therefore, it is not necessary to increase the capacity of the memory of the ECU.

When the two-cylinder operation mode is selected, the ECU 15 checks whether the conditions for the two-cylinder operation mode are satisfied and the actuation or non-actuation of the idle switch 27. In other words, if the idle switch 27 is active, the minimum engine speed is set to 600 rpm. Otherwise, the minimum engine speed is set to 1,600 rpm. Then, control of fuel injection will be started.

The current engine speed is input and compared with the preset minimum engine speed. When the current engine speed is higher than the minimum engine speed, the ECU 15 performs the control operation according to the flowchart A or B (to be described later) depending upon the on- or off-state of the idle switch 27. Then, the ECU 15 allows the engine to undergo the two-cylinder operation mode with reference to the map of FIG. 13 or FIG. 14. On the other hand, when the present engine speed is below the preset reference engine speed, the ECU 15 performs the control operation according to the flowchart C so as to switch the two-cylinder operation mode over to the four-cylinder operation mode. For this purpose, a drive signal is outputted to the hydraulic control unit 26.

As described so far, it is possible to select either the four-cylinder or two-cylinder operation mode according to the foregoing maps and depending upon the on- or off-state of the idle switch 27. For instance, when the engine in the two-cylinder operation mode should be switched over to the four-cylinder operation mode so as to accelerate the automobile, the inactive cylinders can be immediately started by ignoring a delay caused to detect the manifold pressure, which can enhance quick response of the engine for acceleration.

Figure 16:
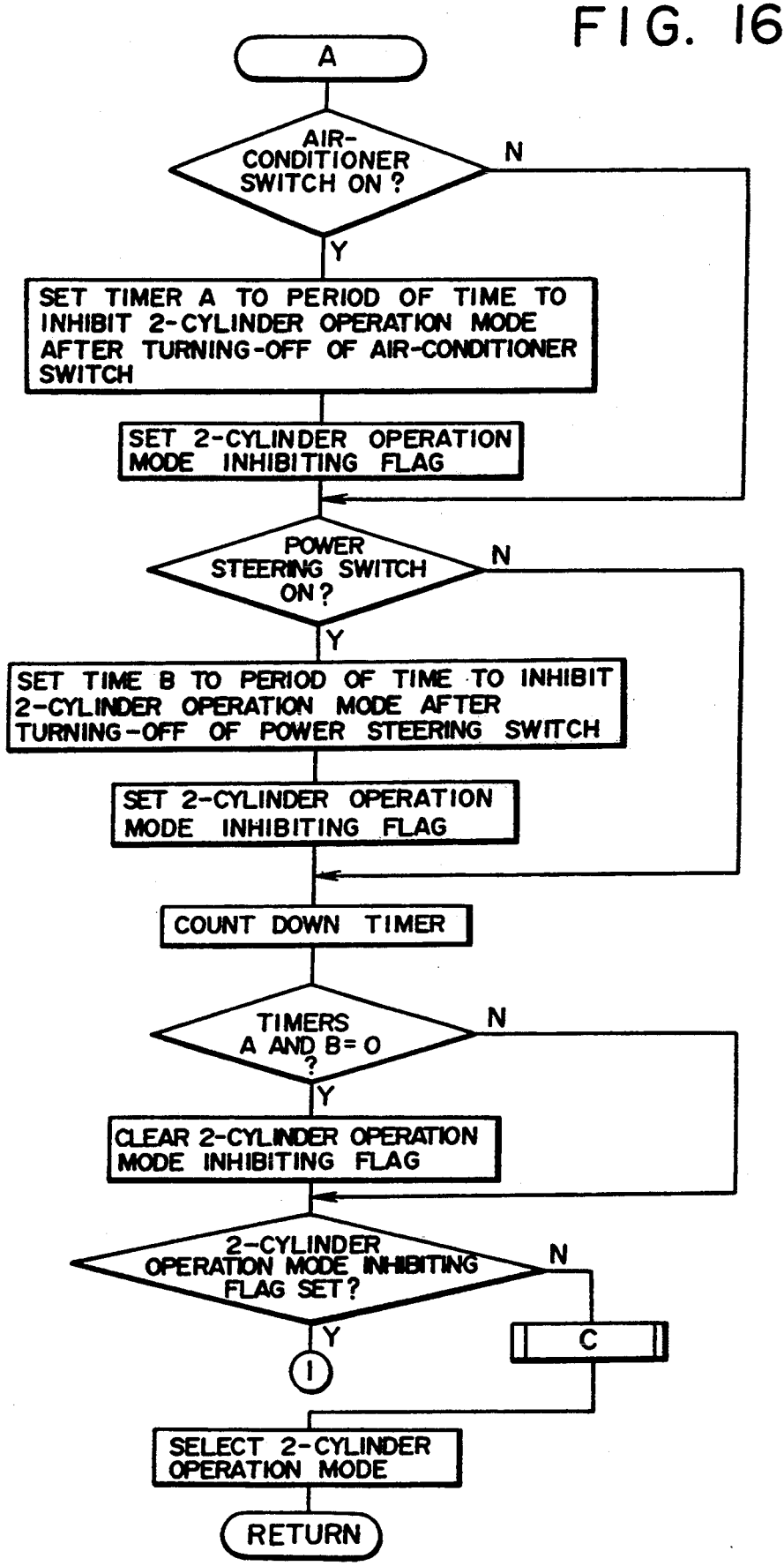
FIG. 16 is a further flowchart showing the operation of the ECU.

FIG. 16 shows the flowchart A for the ECU to inhibit the two-cylinder operation mode when either the air-conditioner or power steering is actuated during the idling.

First of all, the ECU 15 checks whether the air-conditioner switch 29 is active. If the air-conditioner switch 29 is inactive, the ECU 15 checks whether or not the power steering switch 32 has been actuated.

When both the air-conditioner switch 29 and the power steering switch 32 are active, the ECU 15 actuates a timer to set a period of time for inhibiting the two-cylinder operation mode after the turning-off of the switches 29 and 32, and sets a flag for inhibiting the two-cylinder operation mode.

The foregoing inhibiting period is set so as to allow the engine to be switched over to the two-cylinder operation mode after its stable idling.

On the other hand, when neither the air-conditioner switch 29 nor the power steering switch 21 are on, the ECU 15 clears the inhibiting flag and allows the selection of the two-cylinder operation mode after confirming the lapse of the inhibiting period mentioned above.

Under this condition, the ECU 15 checks whether or not the current engine speed (Ne) is below the minimum engine speed which is necessary for the stable and reliable operation of the engine in the two-cylinder operation mode. If the engine speed is below the minimum speed, the ECU 15 sets the inhibiting flag so as to prevent the switchover to the two-cylinder operation mode.

The foregoing checking and comparison are carried out to judge a possibility of an unstable operation or stall of the engine when the two-cylinder operation mode is selected. Following these checking operations, the ECU 15 checks whether the inhibiting flag has been set. If the flag has been set, the ECU 15 advances to the processing as shown in the flowchart C (to be described later). Then, ECU 15 issues a command for the four-cylinder operation mode to the hydraulic control unit 86. Otherwise, the ECU 15 issues a command for the two-cylinder operation mode to the hydraulic control unit 86.

Once the two-cylinder or four-cylinder operation mode is selected according to the map, the ECU 15 refrains from operating either the solenoid valve 26 or 31 of the hydraulic control unit 86 for a certain period of time before proceeding to a next operation mode.

The period for inhibiting the solenoid valve operation is set for the following purpose. Assume that the first solenoid valve 26 is actuated to initiate the selected operation mode and that the rocking pin 92 of the rocker shaft 52 is being engaged or disengaged with or from the recess 95 of the low speed rocker arm 64. When it is required to engage or disengage the rocking pin 92 with or from the recess 95 for the other operation mode, the second-mentioned operation mode is inhibited, thereby preventing insufficient or poor engagement or disengagement of the rocking pin 92 resulting from delayed response caused by hysteresis, or collision between concerned members in the valve systems. The foregoing measures are similarly applied to the second solenoid valve 31.

Figure 18:
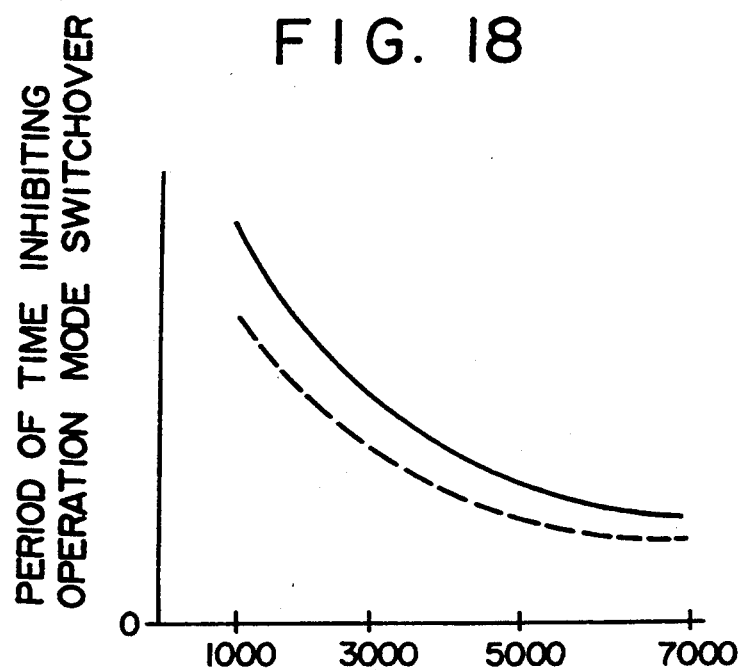
FIG. 18 is a plot diagram for setting a period of time for preventing solenoid valves from performing the switchover operation.

This inhibiting period is set by the map shown in FIG. 18. The map is plotted based on the engine speed which affects the hydraulic pressure to the solenoid valves 26 and 31. The lower the engine speed and the hydraulic pressure, the longer the inhibiting period. In other words, when the engine speed is low, the solenoid valves 26 and 31 take a long time to complete their operation. On the contrary, the inhibiting period becomes shorter as the engine speed increases and the hydraulic pressure is raised.

In FIG. 18, a solid line represents the inhibiting period when a pressure is applied so as to move the rocking pin 92 against the force of the compression spring 100 (this state is called "ON"), while a dashed line represents the inhibiting period when the pressure is reduced so as to move the rocking pin 92 with the compression spring 100 (called "OFF"). The valve operation inhibiting period is longer during the ON state of the solenoid valves as shown by the solid line, while the inhibiting period is shorter during the OFF state of the solenoid valves.

Figure 19:
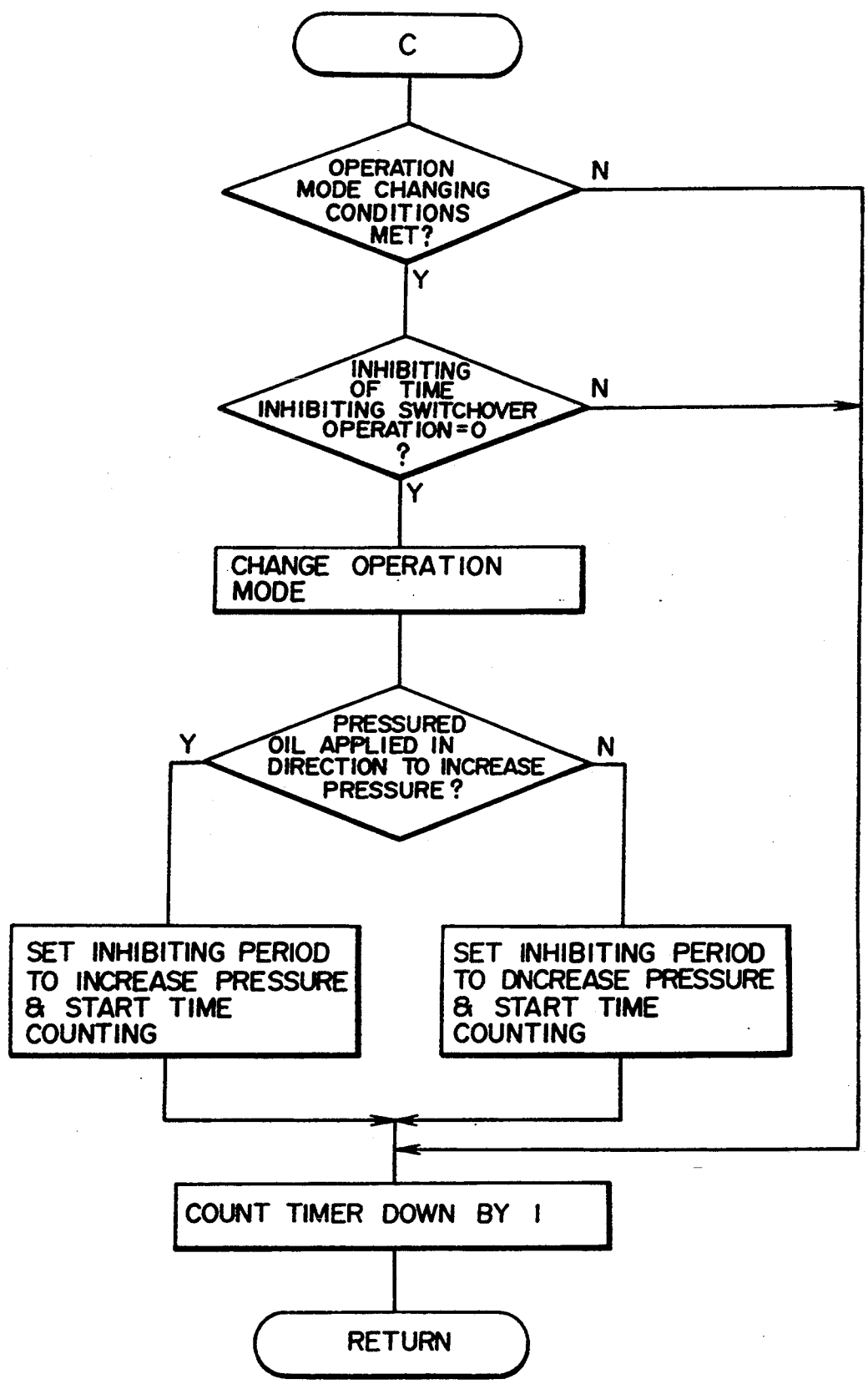
FIG. 19 is a flowchart showing the operation of the ECU of the automobile engine of FIG. 1.

The ECU 15 inhibits the operation of the solenoid valves according to the flowchart C shown in FIG. 19.

Then, the ECU 15 checks whether or not the requirements for changing the operation mode are satisfied. When the requirements are met, the ECU 15 checks whether or not the predetermined period of time after the mode selection has expired, i.e. the lapse of the solenoid valve operation inhibiting period set according to the map of FIG. 18.

When this inhibiting period is "0", the ECU 15 determines the operating position of the solenoid valve 26 or 31 so as to change the operation mode. Otherwise, the ECU 15 resets the inhibiting period timer, thereby getting ready for a succeeding command.

In the former case, the ECU 15 checks the direction to apply the pressure to the solenoid valves 26 or 31. Then, the inhibiting period is set according to the direction of the pressure.

Figure 20:
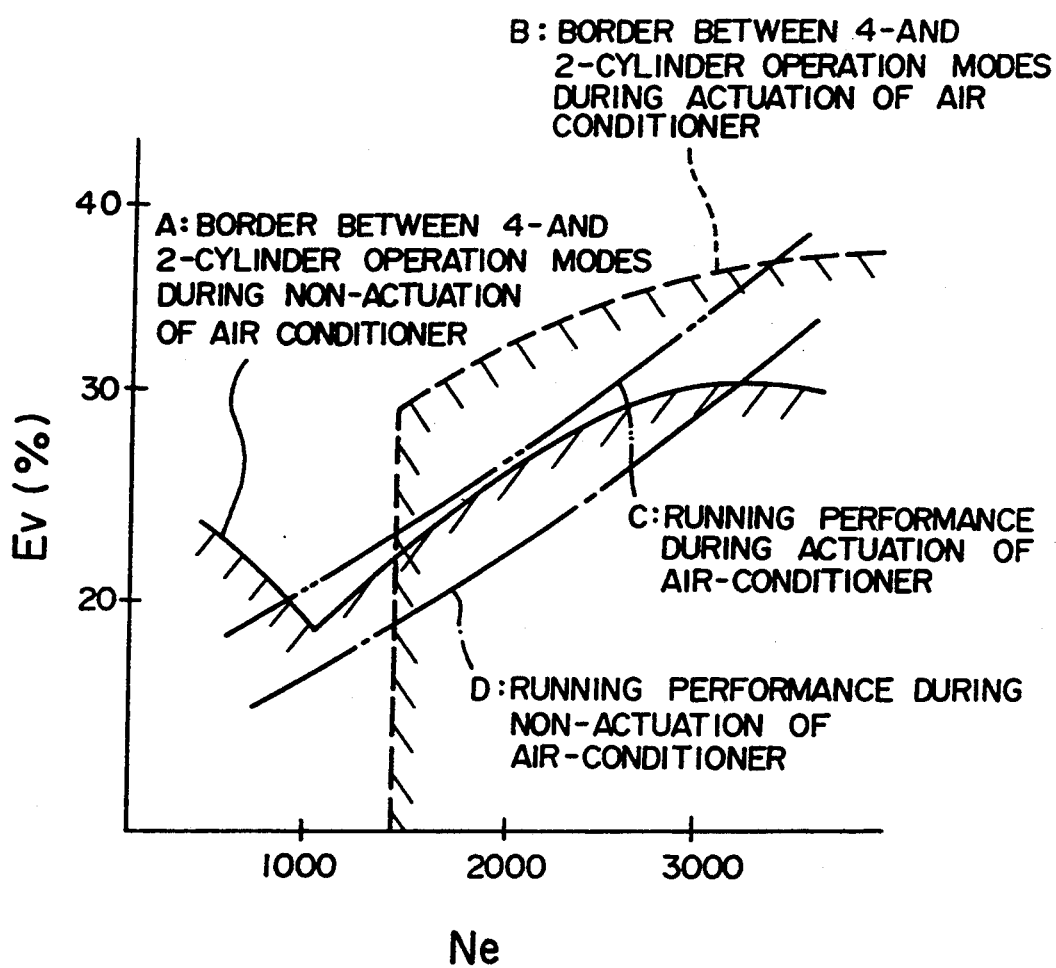
FIG. 20 is a map used by the ECU to check the operation mode of the engine according to the actuation or non-actuation of an air-conditioner.
Figure 21:
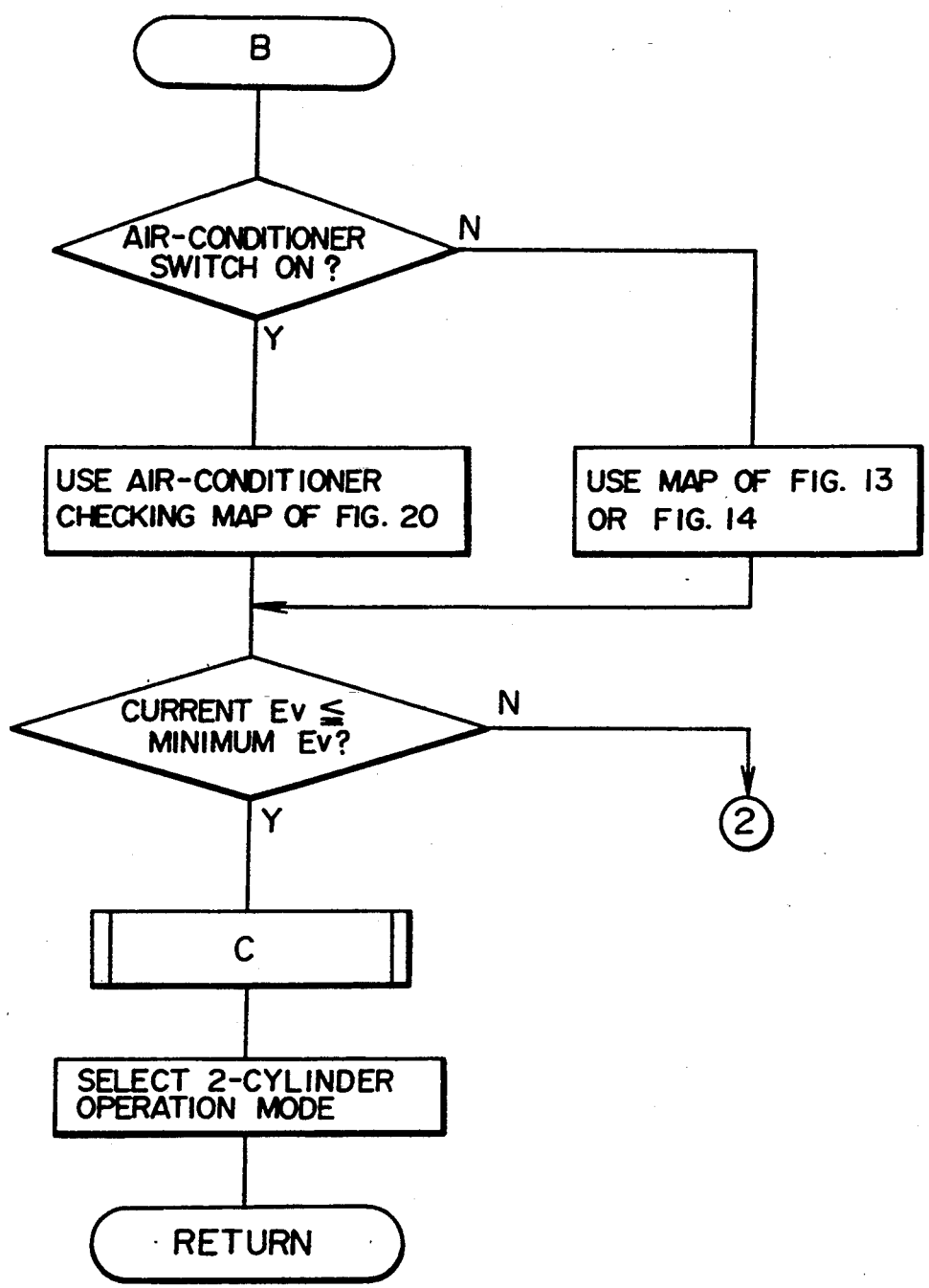
FIG. 21 is a flowchart showing the operation of the ECU.

The ECU 15 also uses a map shown in FIG. 20 so as to check the actuation of the air-conditioner switch 29 during the two-cylinder operation mode of the engine.

The map of FIG. 20 (called "the air-conditioner checking map" hereinafter) is used so that the engine can have a wide operation range for selecting the two-cylinder operation mode even when the so-called idle speed control is performed so as to increase the quantity of intake air in response to a load increased by the actuation of the air-conditioner switch 29.

In FIG. 20, letter A represents the border between the two-cylinder operation mode and the four-cylinder operation mode during the non-actuation of the air-conditioner. Letter B represents the border between the two operation modes during the actuation of the air-conditioner. The border B is determined so as to widen the engine operation range in which the two-cylinder operation mode can be selected regardless of the increase of the volume efficiency resulting from the actuation of the air-conditioner. Alternatively, the map shown in FIG. 13 may be also used in this case to determine the border between the four-cylinder operation mode and the two-cylinder operation mode when the air-conditioner is inactive.

The air-conditioner map of FIG. 20 shows that the two-cylinder operation mode is selectable in an operation range where the volume efficiency is increased, and the idle speed is raised and becomes stable by the idle speed control (ISC). This operation range is wider than the operation range shown by the border A in FIG. 20 where the idling speed is constant due to non-actuation of the air-conditioner.

In FIG. 20, letters C and D represent running performance curves of the engine. In this case, the ordinate denotes an engine output, and the abscissa an engine speed. Specifically, the curve C represents the running performance of the engine in the two-cylinder operation mode during the actuation of the air-conditioner (according to the air-conditioner checking map). The curve D represents the running performance of the engine in the two-cylinder operation mode during the non-actuation of the air-conditioner (according to the map of FIG. 13 or 14). As shown by the curve C, the engine in the two-cylinder operation mode according to the air-conditioner map of FIG. 20 has a higher output and maintains a more effective fuel saving than the engine in the two-cylinder operation mode according to the map of FIG. 13 or 14.

According to the map of FIG. 20, the ECU 15 inhibits the selection of the two-cylinder operation mode when the idle speed of the engine is unstable due to the load increased by the actuation of the air-conditioner switch 29, or is low enough to cause stall. In such a case, the ECU 15 prefers the four-cylinder operation mode.

When the idle switch is off, the ECU 15 changes the operation range of the engine for selecting the two-cylinder mode according to the flowchart B of FIG. 1 depending upon the actuation or non-actuation of the air-conditioner switch.

First of all, the ECU 15 checks whether or not the air-conditioner switch 29 is active. When the switch 29 is inactive, the ECU 15 uses the map of FIG. 13. Otherwise, the ECU 15 uses the map of FIG. 20. With reference to the selected map, the ECU 15 compares the present volume efficiency and the reference volume efficiency, and recognizes that the engine is in the two-cylinder or four-cylinder operation mode. Then, the ECU 15 provides various signals for the current operation mode to the hydraulic control unit 86.

On receiving a throttle opening signal from the throttle opening sensor 8, the ECU 15 checks whether the engine is accelerating, according to a calculated variation of the throttle opening. When the engine is accelerating in the two-cylinder operation mode to save fuel, the ECU 15 actuates the hydraulic control unit 86 so as to switch the engine over to the four-cylinder operation mode regardless of the volume efficiency represented by the manifold pressure.

Figure 22:
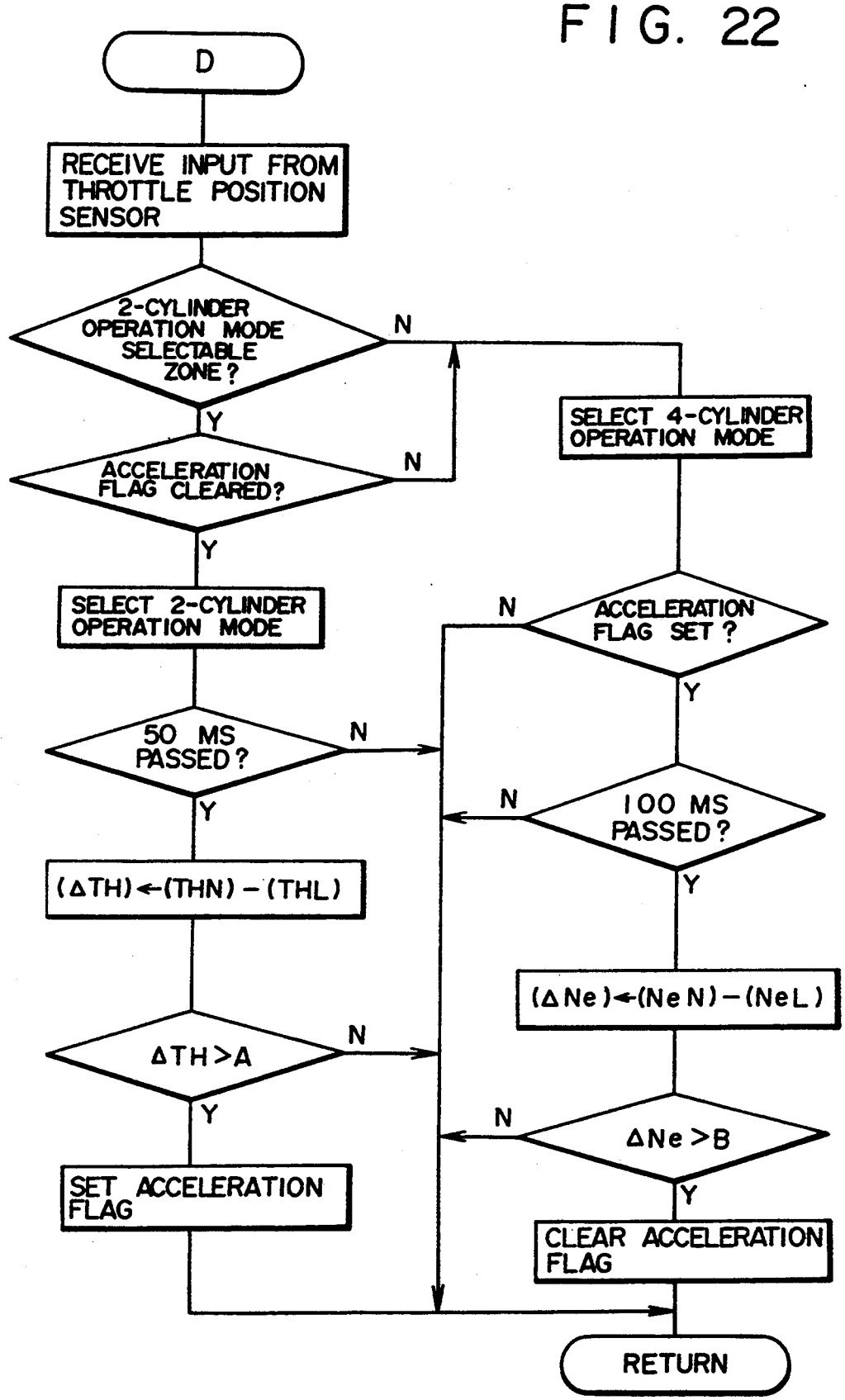
FIG. 22 is a further flowchart showing the operation of the ECU.

Under the foregoing condition, the ECU 15 performs its control operation according to the routine shown by the flowchart D in FIG. 22.

Receiving a signal from the throttle opening sensor 8, the ECU 15 checks whether the volume efficiency and the engine speed are within the range suitable for the two-cylinder operation mode with reference to the map of FIG. 13. When these parameters correspond to the two-cylinder operation range, the ECU 15 checks whether an acceleration flag has been cleared. This acceleration flag is usually set when the variation of the throttle opening is above a predetermined value for a preset period of time. Otherwise, the ECU 15 issues a signal for actuating the hydraulic control unit 86 so as to select the two-cylinder operation mode.

When the two-cylinder operation mode is selected, the ECU 15 checks whether the preset period of time, i.e. 50 ms in this embodiment, has passed. Confirming the lapse of 50 ms, the ECU 15 calculates the variation ($\Delta$TH) according to a difference between the present throttle opening (THN) and the previous throttle opening (THL), and compares the variation ($\Delta$TH) with the preset value (A) so as to check whether the variation ($\Delta$H) is above or below (A) representing the acceleration.

In case the variation ($\Delta$TH) is above (A), i.e. the engine is accelerating, the ECU 15 sets the acceleration flag, and issues the signal for activating the hydraulic control unit 86, thereby switching the two-cylinder operation mode over to the four-cylinder operation mode.

On the other hand, when the acceleration flag has been set, the ECU 15 checks whether the preset period of time, i.e. 100 ms in this embodiment, has passed. Confirming the lapse of 100 ms, the ECU 15 calculates the variation ($\Delta$Ne) of the engine speed based on a difference between the current engine speed (Nen) and the previous engine speed (NeL). Then, the ECU 15 determines whether the variation ($\Delta$Ne) is above or below the preset value (B). If the variation ($\Delta$Ne) is above (B), the ECU 15 confirms the acceleration of the engine, and clears the acceleration flag.

According to the invention, it is possible to inhibit the two-cylinder operation mode when there is any external disturbance which may reduce the engine speed even if the foregoing mode is preferable to save fuel during idling.

Therefore, it is also possible to prevent an unstable engine operation or stall caused by a load increased in the two-cylinder operation mode.

Further, when selecting the four-cylinder or two-cylinder operation mode, the solenoid valves associated with the selected mode remain active for the preset period of time. During this preset period of time, it is inhibited to switch the four cylinder operation mode over to the two-cylinder operation mode or vice versa. Therefore, even if the solenoid valves are frequently operated to change the operation mode of the engine, the hydraulic control unit can be prevented from operating improperly, or components of the solenoid valves such as spool valves can be protected against damages.

The period of time for inhibiting the operation of the solenoid valves varies with the pressure and the direction of oil applied to the solenoid valves and the direction for applying the oil pressure. Therefore, the solenoid valves can be reliably maintained at their operating positions.

In the invention, the four-cylinder or two-cylinder operation mode is selected according to different maps depending upon the actuation and non-actuation of the air-conditioner. When the air-conditioner is active, the engine can therefore continue the two-cylinder operation mode even if the volume efficiency is relatively high. It is possible to save fuel regardless the status of the air-conditioner.

When the air-conditioner is active during the idling, the engine is set in the four-cylinder operation mode regardless of the variation of the volume efficiency, thereby being protected against an unstable operation and stall. Thus, the fuel saving can be accomplished without adversely affecting the operation of the engine and the air-conditioner.

To select either the four-cylinder or two-cylinder operation mode, acceleration of the engine is checked based on the variation of the throttle opening. Therefore, the engine can quickly produce an output necessary for the acceleration without being affected by delayed variation of the boost pressure resulting from delayed intake of air or delayed actuation of the actuator in the hydraulic control unit.

In addition, the two-cylinder operation mode is switched over to the four-cylinder operation mode based on the variation of the throttle opening. Thus, the output of the engine can be controlled as desired by the driver. In this case, the ignition sequence of the four cylinders is adjusted to cope with the fuel injection thereto. Therefore, it is possible to suppress abnormal vibrations at the time of switchover to the four-cylinder operation mode and unstable engine operation resulting from delayed combustion stroke.

As described so far, when selecting either the four- or two-cylinder operation mode is selected, the engine speed which varies with the on- or off-state of the idle switch is compared with the predetermined reference speed where the engine suffers from vibrations. Only when the engine is operating at the speed where it is free from vibrations, the two-cylinder operation mode can be maintained so as to attain fuel saving. Thus, the engine can assume the two-cylinder operation mode even when it is operating at a low speed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Advantages and Industrial Applicability

The automobile engine according to the invention is applicable to motor vehicles including OHC type valve systems, and more particularly applicable to automobile engines whose operating conditions such as an engine speed are continuously variable.

What is claimed is:

1. An automobile engine having a partial cylinder operation mode rendering inoperative some cylinders, comprising:
   an engine speed sensor for detecting an engine speed;
   a manifold pressure sensor for providing boost pressure data so as to detect a negative pressure of an intake pipe; and
   a control unit having a plurality of maps defined by ranges of detected engine speed and boost pressure data for selectively operating the engine in a partial cylinder operation range mode, one of said plurality of maps being selected in response to an output from a load switch for detecting an engine load.

2. The automobile engine of claim 1, wherein the load switch is an idle switch.

3. The automobile engine of claim 2, wherein an engine speed for rendering inoperative some cylinders is higher during an idling state than during a non-idling state.

4. The automobile engine of claim 3, wherein the plurality of maps includes a first map in which the partial cylinder operation mode range is set in a manner such that the volumetric efficiency is gradually increased between a desired low speed range and a desired intermediate speed range during the non-idling operation, and a second map in which the partial cylinder operation mode range is set in manner such that the volumetric efficiency is decreased between a desired idle speed and a desired low speed range and is then increased between the desired low speed range and a desired intermediate speed range.

5. The automobile engine of claims 1, wherein the load switch is an air-conditioner switch.

6. The automobile engine of claims 1, wherein the load switch is a power steering switch.

7. The automobile engine of claims 1, wherein the load switch is a throttle opening sensor.

8. The automobile engine of claim 7, wherein the partial cylinder operation mode is canceled when a variation of the throttle opening detected by the throttle opening sensor is above a predetermined value.

9. The automobile engine of claim 1, wherein one of said plurality of maps momentarily increases the volumetric efficiency when the engine speed is low.

10. The automobile engine of claim 9, wherein one of said plurality of maps decreases the volumetric efficiency between a desired idle speed and a desired low speed range but then gradually increases the volumetric efficiency between the desired low speed range and a desired intermediate speed range.

11. The automobile engine of claim 1, wherein the control unit cancels the partial cylinder operation mode when it detects the idling, and one of the actuation of an air-conditioner, the actuation of a power steering, and an abnormal engine speed.

12. The automobile engine of claim 11, wherein the control unit inhibits the partial cylinder operation mode for a preset period of time after detecting non-actuation of the air-conditioner and the power steering.

13. The automobile engine of claim 12, wherein during the actuation of the air-conditioner in the partial cylinder operation mode, an engine output is set to be larger than the engine output during the non-actuation of the air-conditioner in the partial cylinder operation mode.

14. The automobile engine of claim 12, wherein during the actuation of the power steering in the partial cylinder operation mode, an engine output is set to be larger than the engine output during the non-actuation of the power steering in the partial cylinder operation mode.

15. The automobile engine of claim 1, wherein the control unit inhibits the partial cylinder operation mode when an engine speed is below a predetermined value.

16. The automobile engine of claim 1, wherein the control unit varies the partial cylinder operation range depending upon the actuation or non-actuation of the air-conditioner when the engine is not idling.

17. The automobile engine of claim 16, wherein during the actuation of the air-conditioner, the control unit sets a lowest engine speed to be higher than a lowest engine speed during the non-actuation of the air-conditioner.

18. The automobile engine of claim 17, wherein the control unit includes a map in which the partial cylinder operation mode range is set in a manner such that the volumetric efficiency is gradually increased between a desired low speed range and a desired intermediate speed range during the actuation of the air-conditioner, and a third map in which the partial cylinder operation mode range is set in a manner such that the volumetric efficiency is decreased between a desired idle speed range between a desired low speed range and is then increased between the desired low speed range and a desired intermediate speed range during the non-actuation of the air-conditioner.

19. The automobile engine of claim 1, wherein the control unit inhibits for a preset period of time the full cylinder operation mode from being switched over to the partial cylinder operation mode even when the engine becomes ready for the partial cylinder operation mode.

20. The automobile engine of claim 19, wherein the preset period of time for inhibiting the switchover is lengthened as the engine speed becomes lower.

21. The automobile engine of claim 1, wherein the control unit inhibits for a preset period of time the partial cylinder operation mode from being switched over to the full cylinder operation mode even when the engine gets ready for the full cylinder operation mode.

22. The automobile engine of claim 21, wherein the preset period of time for inhibiting the switchover is lengthened as the engine speed becomes lower.

23. The automobile engine of claim 1, wherein the control unit sets the period of time for inhibiting the switchover of the partial cylinder operation mode to the full cylinder operation mode to be shorter than the period of time for inhibiting the switchover of the full cylinder operation mode to the partial cylinder operation mode.

* * * * *

UNITED STATES PATENT AND TRADEMARK OFFICE
CERTIFICATE OF CORRECTION

PATENT NO. : 5,425,335
DATED : June 20, 1995
INVENTOR(S) : Katsuhiko MIYAMOTO et al.

It is certified that error appears in the above-indentified patent and that said Letters Patent is hereby corrected as shown below:

Column 19,
    Claim 3, line 3, change "higher" to read --lower--.

Signed and Sealed this

Nineteenth Day of September, 1995

Attest:

BRUCE LEHMAN

*Attesting Officer*      *Commissioner of Patents and Trademarks*